(12) United States Patent
Shepherd et al.

(10) Patent No.: US 12,373,835 B2
(45) Date of Patent: *Jul. 29, 2025

(54) FRONT MONEY AS GAMING ESTABLISHMENT ACCOUNT OVERDRAFT PROTECTION

(71) Applicant: IGT, Las Vegas, NV (US)

(72) Inventors: Jeffery Shepherd, Reno, NV (US); Kevin Higgins, Reno, NV (US)

(73) Assignee: IGT, Las Vegas, NV (US)

( * ) Notice: Subject to any disclaimer, the term of this patent is extended or adjusted under 35 U.S.C. 154(b) by 500 days.

This patent is subject to a terminal disclaimer.

(21) Appl. No.: 17/856,264

(22) Filed: Jul. 1, 2022

(65) Prior Publication Data

US 2024/0005322 A1    Jan. 4, 2024

(51) Int. Cl.
*G06Q 20/40* (2012.01)
*G06Q 20/10* (2012.01)
*G06Q 20/20* (2012.01)
*G06Q 50/34* (2012.01)
*G07F 17/32* (2006.01)

(52) U.S. Cl.
CPC ......... *G06Q 20/4014* (2013.01); *G06Q 20/10* (2013.01); *G06Q 20/20* (2013.01); *G06Q 50/34* (2013.01); *G07F 17/3244* (2013.01)

(58) Field of Classification Search
CPC ............ G07F 17/3244; G07F 17/3241; G06Q 20/4014; G06Q 20/10; G06Q 20/20; G06Q 50/34; G06Q 20/28; G06Q 20/322; G06Q 20/36; G06Q 20/401; G06Q 20/403; G06Q 20/405

USPC ......................................................... 463/25
See application file for complete search history.

(56) References Cited

U.S. PATENT DOCUMENTS

| | | | |
|---|---|---|---|
| 6,134,536 A * | 10/2000 | Shepherd | G06Q 10/06 705/37 |
| 6,786,400 B1 * | 9/2004 | Bucci | G07F 7/08 235/382 |
| 7,664,705 B2 | 2/2010 | Walker et al. | |
| 8,452,687 B2 | 5/2013 | Rowe | |
| 9,384,629 B2 | 7/2016 | Chun et al. | |
| 10,546,463 B2 | 1/2020 | Higgins et al. | |
| 12,056,983 B2 * | 8/2024 | Shepherd | G06Q 20/4014 |
| 2003/0004871 A1 * | 1/2003 | Rowe | G07F 17/32 705/39 |
| 2009/0089205 A1 * | 4/2009 | Bayne | G06Q 20/1085 705/43 |
| 2011/0246355 A1 | 10/2011 | Griffin et al. | |
| 2013/0013506 A1 * | 1/2013 | Wiggins | G06Q 30/02 705/44 |
| 2013/0226805 A1 | 8/2013 | Griffin et al. | |
| 2014/0114721 A1 | 4/2014 | Peister | |

(Continued)

OTHER PUBLICATIONS

RaleighCraps, "Front Money", https://wizardofvegas.com/forum/gambling/tables/2423-front-money/, Oct. 8, 2010 (Year: 2010).*

*Primary Examiner* — Michael A Cuff

(74) *Attorney, Agent, or Firm* — Neal, Gerber & Eisenberg, LLP

(57) ABSTRACT

Systems and methods that utilize funds accessed from a gaming establishment front money handling system to provide an overdraft protection feature to one or more gaming establishment accounts.

20 Claims, 2 Drawing Sheets

(56) References Cited

U.S. PATENT DOCUMENTS

| | | | |
|---|---|---|---|
| 2015/0235521 A1* | 8/2015 | Lutnick | G07F 17/3227 |
| | | | 463/25 |
| 2019/0122492 A1 | 4/2019 | Nguyen | |
| 2019/0164153 A1* | 5/2019 | Agrawal | G06Q 20/065 |
| 2020/0265384 A1* | 8/2020 | Bleazard | G06F 3/0482 |
| 2021/0256808 A1* | 8/2021 | Palmisano | G06Q 30/0209 |
| 2021/0287491 A1 | 9/2021 | Warner et al. | |
| 2022/0130206 A1 | 4/2022 | Shepherd et al. | |
| 2022/0138845 A1 | 5/2022 | Shepherd et al. | |
| 2022/0188919 A1 | 6/2022 | Higgins et al. | |

* cited by examiner

FRONT MONEY AS GAMING ESTABLISHMENT ACCOUNT OVERDRAFT PROTECTION

BACKGROUND

In various embodiments, the systems and methods of the present disclosure utilize front money provided by a user to provide an overdraft protection feature to one or more gaming establishment accounts.

Casinos are associated with multiple different channels of commerce including gaming activities (e.g., wagers on plays of games at electronic gaming machines and gaming tables) and non-gaming activities (e.g., making retail purchases at point-of-sale terminals throughout the casino).

BRIEF SUMMARY

In certain embodiments, the present disclosure relates to a system including a processor, and a memory device that stores a plurality of instructions. When executed by the processor following an occurrence of a request to complete a transaction associated with a first amount of funds from a gaming establishment account, and responsive to the gaming establishment account being associated with overdraft protection and the gaming establishment account being associated with a second amount of funds that is less than the first amount of funds, the instructions cause the processor to communicate, to a device, data associated with an authorization to complete the transaction, wherein a difference between the first amount of funds and the second amount of funds is accessed from an amount of front money associated with a user. When executed by the processor responsive to the gaming establishment account not being associated with overdraft protection and the gaming establishment account being associated with the second amount of funds that is less than the first amount of funds, the instructions cause the processor to communicate, to the device, data associated with a denial to complete the transaction.

In certain embodiments, the present disclosure relates to a system including a processor, and a memory device that stores a plurality of instructions. When executed by the processor after an establishment of overdraft protection associated with a gaming establishment account, the instructions cause the processor to receive data associated with a request to access a first amount of funds from the gaming establishment account when the gaming establishment account is associated with a second amount of funds that is less than the first amount of funds. When executed by the processor responsive to the request complying with an overdraft protection control, the instructions cause the processor to communicate a request for a third amount of funds to a component of a gaming establishment front money handling system that maintains an amount of front money associated with a user. When executed by the processor responsive to the third amount of funds being transferred from the front money associated with the user to the gaming establishment account, the instructions cause the processor to approve the request to access the first amount of funds from the gaming establishment account.

In certain embodiments, the present disclosure relates to a method of operating a system. Following an occurrence of a request to complete a transaction associated with a first amount of funds from a gaming establishment account and responsive to the gaming establishment account being associated with overdraft protection and the gaming establishment account being associated with a second amount of funds that is less than the first amount of funds, the method includes communicating, by a processor and to a device, data associated with an authorization to complete the transaction, wherein a difference between the first amount of funds and the second amount of funds is accessed from an amount of front money associated with a user. Responsive to the gaming establishment account not being associated with overdraft protection and the gaming establishment account being associated with the second amount of funds that is less than the first amount of funds, the method includes communicating, by the processor and to the device, data associated with a denial to complete the transaction.

Additional features are described herein, and will be apparent from the following Detailed Description and the figures.

DETAILED DESCRIPTION

Figure 1:
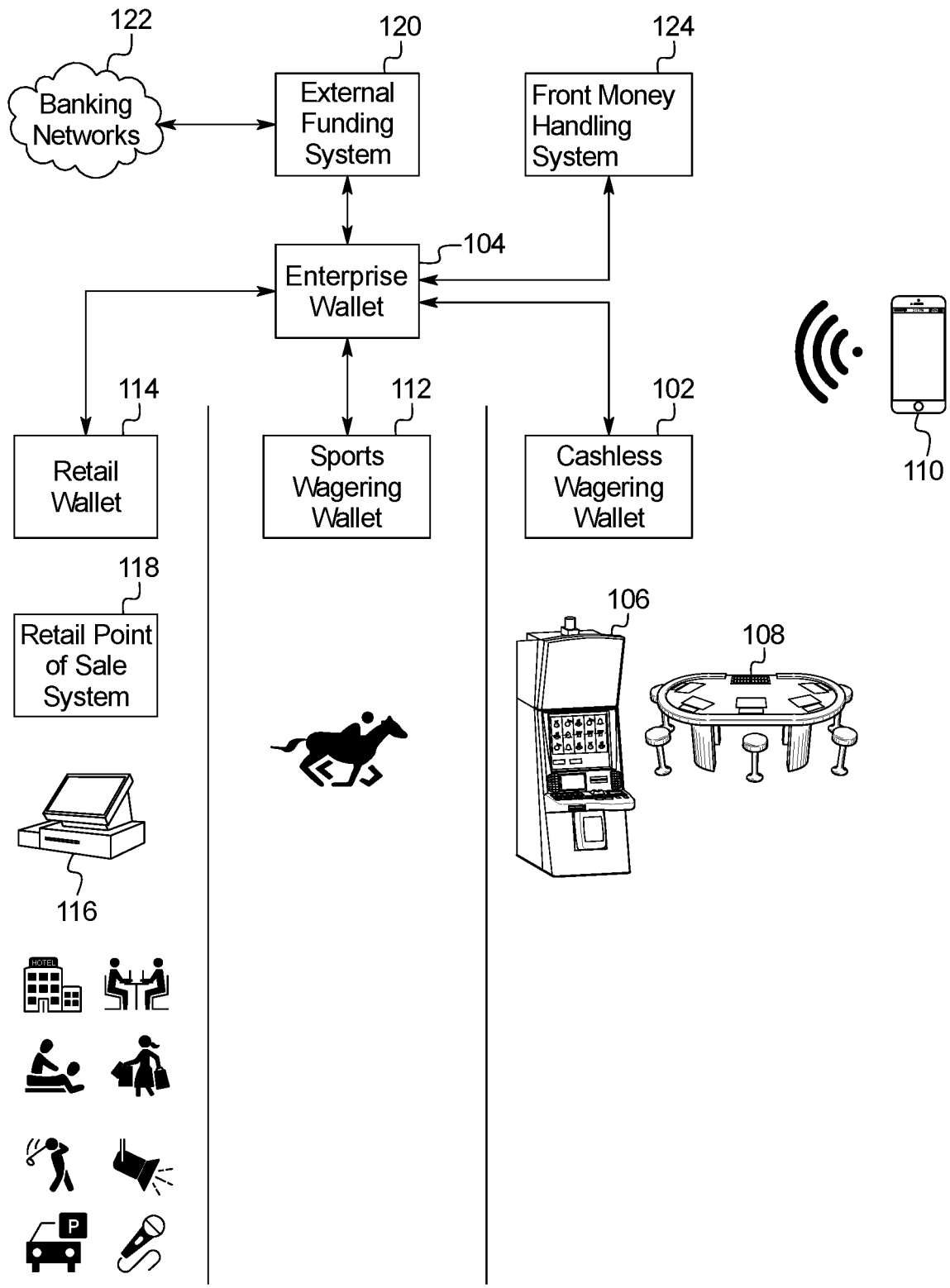
FIG. 1 is an example configuration of the architecture of a plurality of different components of the system of the present disclosure.

In various embodiments, the systems and methods of the present disclosure utilize front money provided by a user to provide overdraft protection to one or more gaming establishment accounts.

In certain embodiments, in view of the friction encountered by certain users in having certain transactions at a gaming establishment device declined due to inadequate funds in a gaming establishment account to complete a requested transaction, the system accesses an amount of funds from a funding source associated with overdraft protection that is backed by front money provided by the user. In these embodiments, rather than denying a requested transaction if a single funding source lacks the requested amount of funds to complete the requested transaction, the system of the present disclosure coordinates obtaining the requested amount of funds from multiple funding sources (i.e., front money previously provided by a user and funds from a gaming establishment account maintained for that user) to complete a requested transaction at a gaming establishment device. For example, if a user requests to complete a purchase at a gaming establishment point-of-sale retail terminal (i.e., a gaming establishment device) and the system determines that a gaming establishment retail account associated with that user lacks adequate funds to complete the requested purchase, in association with an activated overdraft protection feature, the system accesses an amount of user provided front money to fund the deficiency in the gaming establishment retail account (including, in certain instances, issuing a marker for the accessed amount of front money) and completes the requested purchase. In another example, if a user requests to transfer an amount of funds from a gaming establishment wagering account to an electronic gaming machine and the system determines that the gaming establishment wagering account associated with that user lacks adequate funds to complete the requested transfer, in association with an activated overdraft protection feature, the system accesses an amount of user provided front money to fund the deficiency in the gaming establishment wagering account (including, in certain embodiments, issuing a marker for the accessed amount of front money) and completes the requested transfer. Such a configuration provides the user greater control over their funds, such as providing the user with the ability to complete a transaction at a gaming establishment device wherein part of the funds associated with such a transaction are accessed from front money usable to provide overdraft protection on one or more other gaming establishment accounts.

In certain embodiments, upon a user requesting an amount of funds at a gaming establishment device, such as a non-gaming device (e.g., a retail point-of-sale terminal) or a gaming device (e.g., an electronic gaming machine ("EGM") or a gaming table component associated with a gaming establishment gaming table) to complete a transaction, the system determines if an amount of funds, if any, currently associated with a gaming establishment account associated with the user is at least equal to the requested amount of funds. For example, following a user at a gaming establishment retail point-of-sale terminal requesting an amount of funds from a gaming establishment retail account to purchase a good and/or a service, the gaming establishment retail point-of-sale terminal interfaces with a component of a gaming establishment fund management system to request the amount of funds. In this example, the component of the gaming establishment fund management system determines if the gaming establishment retail account associated with the user and maintained by the gaming establishment fund management system includes a sufficient balance to cover the requested amount of funds to complete the purchase.

In certain embodiments, if the system determines that the amount of funds currently associated with the gaming establishment account covers the requested amount of funds to complete the transaction, the system coordinates the transfer of the requested amount of funds from the gaming establishment account to the gaming establishment device (or an account associated with the gaming establishment device). That is, responsive to a gaming establishment account including an amount of funds to satisfy the requested amount of funds, one or more components of the system cause part or all of the amount of funds residing in the gaming establishment account to be available to fund one or more activities of the gaming establishment device (without requiring any activation of any funds from any user provided front money or any issuance of any markers against such front money). For example, following a determination that the gaming establishment retail account associated with the user includes a sufficient balance to cover an amount of funds to complete the purchase at the gaming establishment retail point-of-sale terminal, a component of a gaming establishment fund management system and the gaming establishment retail point-of-sale terminal interface to transfer the requested amount of funds from the gaming establishment retail account associated with the user to the gaming establishment retail point-of-sale terminal (or a component of a gaming establishment retail system associated with the gaming establishment retail point-of-sale terminal) to complete the purchase transaction (without requiring any activation of any funds from any user provided front money or any issuance of any markers against such front money).

In certain embodiments, if the system determines that the amount of funds currently associated with the gaming establishment account covers less than the requested amount of funds to complete the transaction, the system determines if the gaming establishment account is associated with an overdraft protection feature backed by user provided front money. That is, if a shortfall exists with the amount of funds available from the gaming establishment account relative to the amount of funds requested from the gaming establishment account to complete the transaction, the system determines if any overdraft protection that is backed by front money provided by the user is available to potentially complete the requested transaction.

If the system determines that the gaming establishment account is associated with an overdraft protection feature associated with user provided front money, the system determines if the balance of the front money covers the shortfall between the amount of funds, if any, currently associated with the gaming establishment account and the requested amount of funds to complete the transaction. In these embodiments, upon a determination that a gaming establishment account associated with overdraft protection lacks sufficient funds to satisfy the requested amount of funds (and in certain embodiments, additionally determines that no overdraft protection controls would be violated if front money were accessed in association with the attempted transaction), the system automatically determines if the balance of the front money, when accounting for any funds accessed from the gaming establishment account, satisfies the amount of funds to complete the requested transaction.

In certain embodiments, if the system determines that the gaming establishment account does not have any overdraft protection feature provided via any user provided front money, that one or more overdraft protection controls would be violated via accessing the front money or that the balance of the front money would not cover the shortfall between the amount of funds, if any, currently associated with the gaming establishment account and the requested amount of funds to complete the transaction, the system denies the requested transaction. In other words, upon a determination that funds currently held in a gaming establishment account without any overdraft protection do not at least equal the requested amount of funds or that the available amount of funds in a front money account associated with the overdraft protection feature will not, when combined with any funds in that gaming establishment account, at least equal the requested amount of funds, the system denies the attempted transfer of funds and does not complete the requested transaction. For example, following a determination that a gaming establishment retail account associated with a user lacks a sufficient balance to complete a purchase at a gaming establishment retail point-of-sale terminal and following a determination that a balance of the front money account used to back the overdraft protection feature for the gaming establishment retail account fails to make up the shortfall of this insufficient gaming establishment retail account balance, the system denies the requested transfer and does not complete the attempted purchase at the gaming establishment retail point-of-sale terminal.

On the other hand, if the system determines that the gaming establishment account has an overdraft protection feature provided via user provided front money, no overdraft protection controls would be violated via accessing the user provided front money and the balance of the front money account covers the shortfall between the amount of funds, if any, currently associated with the gaming establishment account and the requested amount of funds to complete the transaction, the system coordinates the transfer to the gaming establishment device of any amounts of funds in the gaming establishment account and an amount of funds accessed from the front money provided by the user. In these embodiments, the system operates to coordinate a transfer of funds from a gaming establishment account and/or from an accessed balance of user provided front money such that, collectively, the requested amount of funds are transferred to the gaming establishment device (or to an account associated with the gaming establishment device). For example, following a determination that a gaming establishment retail account associated with a user lacks a sufficient balance to cover an amount of funds requested to complete a purchase at a gaming establishment retail point-of-sale terminal and following a determination that the gaming establishment retail account is associated with an overdraft protection feature backed by front money provided by the user, a component of a gaming establishment front money handling system interfaces with a component of a gaming establishment fund management system to transfer a first part of the requested amount of funds from a balance of the front money provided by the user to the gaming establishment retail account associated with the user and, in certain embodiments, to issue a marker for the amount of funds accessed from the front money provided by the user. In addition to this accessing the user provided front money in association with an overdraft protection feature, a component of a gaming establishment fund management system and the gaming establishment retail point-of-sale terminal (or a component of a gaming establishment retail system associated with the gaming establishment retail point-of-sale terminal) interface to transfer the requested amount of funds from the gaming establishment retail account to the gaming establishment retail point-of-sale terminal (or an account associated with the gaming establishment retail point-of-sale terminal) to complete the purchase at the gaming establishment retail point-of-sale terminal. As illustrated by this example, upon a determination that a combination of any funds currently held in a gaming establishment account (or across multiple gaming establishment accounts) and funds currently available to be accessed from any front money employed to provide overdraft protection at least equals the requested amount of funds to complete the transaction, the system proceeds with completing the transaction with funds from these different funding sources.

It should be appreciated that while this example includes a transfer of funds of funds from the gaming establishment front money handling system to a gaming establishment account maintained by the gaming establishment fund management system prior to the completion of the transaction, such a transfer may occur after the completion of the transaction to cure the gaming establishment account being overdrawn to complete the transaction. In these embodiments, while the system may confirm that the balance of the front money provided by the user is at least an amount necessary to complete the transaction (and may put a hold on other uses of such an amount of funds), the access of the funds from the front money and any corresponding issuance of any markers for such funds may occur following the completion of the transaction, such as at a predetermined point in time in association with a scheduled reconciliation process or upon gaming establishment personnel requesting such a reconciliation of funds accessed from the front money provided by the user.

It should be further appreciated that while this example includes a transfer of funds from the gaming establishment front money handling system to the gaming establishment account maintained by the gaming establishment fund management system prior to such funds being transferred to the gaming establishment device to complete the transaction, such funds may be transferred from the gaming establishment front money handling system to the gaming establishment device to, when combined with any funds residing in the gaming establishment account that are also transferred to the gaming establishment device, complete the transaction. In these embodiments, rather than the gaming establishment front money handling system transferring any funds accessed from the front money provided by the user to a gaming establishment account associated with a user prior to such funds being subsequently transferred to their final destination, such as a gaming establishment device or an account associated with the gaming establishment device, the gaming establishment front money handling system directly transfers any funds accessed from the front money provided by the user to their final destination, such as a gaming establishment device or an account associated with the gaming establishment device, bypassing any other accounts associated with the user.

Such a configuration of initiating, in certain instances on demand, the activation of an amount of funds associated with available front money reduces friction encountered by certain users in completing transactions, saves users time in accessing front money and provides a relatively safer gaming establishment environment (e.g., minimizing users and/or gaming establishment personnel having to carry large sums of cash or ticket vouchers associated with large sums of money). Such a configuration further reduces the use of paper ticket vouchers (which a gaming establishment cage may issue against front money provided for use at an EGM and/or a gaming table) thus reducing the amount of waste produced by gaming establishments (and realizing an environmental benefit of implementing the system of the present disclosure).

In various embodiments, the present disclosure is directed to a gaming establishment fund management system including various sub-systems that are each associated with or otherwise maintain one or more electronic or virtual accounts. In these embodiments, the various accounts maintained for a user collectively form a resort or enterprise account (i.e., a gaming establishment fund management account) for the user. That is, the collection of cashless wagering accounts (e.g. cashless gaming establishment wagering wallets, cashless sports wagering wallets and/or cashless mobile wagering wallets) and gaming establishment retail accounts (e.g., gaming establishment retail wallets) associated with or otherwise maintained for a user, such as a retail patron, collectively form a resort or enterprise account (i.e., an integrated resort or gaming establishment fund management wallet) that the user may access to transfer funds and/or view balance information amongst the various accounts associated with or otherwise maintained for the user.

In various embodiments, the gaming establishment fund management system includes or is otherwise associated with one or more cashless wagering systems. Each cashless wagering system is associated with or otherwise maintain one or more cashless wagering accounts. In different embodiments, zero, one or more of these cashless wagering accounts are associated with (or otherwise configured to be associated with upon one or more inputs from a user and/or gaming establishment personnel) an overdraft protection feature that is backed by front money provided by the user.

In certain embodiments, the gaming establishment fund management system includes a first cashless wagering system that maintains a first cashless wagering account. In these embodiments, a user, such as a player of an EGM, utilizes a mobile device application running on a mobile device and/or a physical instrument (e.g., a smart card or a user issued magnetic striped card which the user utilizes via inserting the card into a player tracking unit associated with the EGM) to facilitate the electronic transfer of any funds between this first cashless wagering account and a gaming device, such as a component of a gaming table and/or an EGM (including, but not limited to, a slot machine, a video poker machine, a video lottery terminal, a terminal associated with an electronic table game, a terminal associated with a live table game, a video keno machine, a video bingo, and/or a sports betting terminal (that offers wagering games and/or sports betting opportunities)). For example, as seen in FIG. 1, the gaming establishment fund management system includes a first cashless wagering system (not shown) that maintains a Cashless Wagering Wallet 102 (e.g., a first cashless wagering account) which is in communication with the enterprise wallet 104. In this example, to facilitate the transfer of funds between this cashless wagering account and a credit balance of an EGM 106 and/or a credit balance of a gaming table component (not shown) associated with a gaming table 108, the system utilizes a mobile device 110 running a mobile device application that interfaces with one or more components of the gaming establishment fund management system to enable a user, such as a player of the EGM or a player at the gaming table, access to this first cashless wagering account.

In certain embodiments, the gaming establishment fund management system additionally or alternatively includes or is otherwise associated with a second cashless wagering system that maintains a second cashless wagering account. In these embodiments, funds associated with the second cashless wagering account are utilized to place one or more sporting event wagers and/or wagers placed remote from an EGM and a gaming table. In such embodiments, a user utilizes a mobile device application running on a mobile device and/or a physical instrument (e.g., a smart card or a user issued magnetic striped card which the user utilizes via inserting the card into a kiosk) to facilitate the electronic transfer of any funds between this second cashless wagering account and a credit balance accessible to wager on sporting events and/or games of chance (or games of skill) remote from an EGM and a gaming table. For example, as seen in FIG. 1, the gaming establishment fund management system includes a second cashless wagering system (not shown) that maintains a Sports Wagering Wallet 112 (e.g., a second cashless wagering account) which is in communication with the enterprise wallet 104. In this example, to facilitate the transfer of funds between this cashless wagering account and a credit balance associated with a sporting event wagering system (not shown) and/or a remote wagering system (not shown) to enable the placement of one or more wagers on one or more sporting events and/or one or more games of chance (or games of skill), the system utilizes a mobile device 110 running a mobile device application that interfaces with one or more components of the gaming establishment fund management system to enable, amongst other activities, a user, such as a user remote from the gaming establishment, access to this second cashless wagering account.

In various embodiments, in addition to or an alternative of maintaining one or more cashless wagering accounts via one or more cashless wagering systems, the gaming establishment fund management system includes or is otherwise associated with one or more gaming establishment retail wallet systems that each maintain one or more gaming establishment retail accounts. In different embodiments, zero, one or more gaming establishment retail accounts are associated with (or otherwise configured to be associated with upon one or more inputs from a user and/or gaming establishment personnel) an overdraft protection feature that is backed by front money provided by the user.

In certain embodiments, such a gaming establishment retail account (e.g., a gaming establishment retail wallet) of a gaming establishment retail wallet system integrates with various retail point-of-sale systems throughout the gaming establishment (or located remote from the gaming establishment, but otherwise associated with the gaming establishment) to enable users to purchase goods and/or services via the user's gaming establishment retail account. For example, as seen in FIG. 1, the gaming establishment fund management system includes a gaming establishment retail wallet system (not shown) that maintains a Retail Wallet 114 (e.g., a gaming establishment retail account) which is in communication with the enterprise wallet 104. In this example, to facilitate the transfer of funds between this gaming establishment retail account and an account associated with a retailer to purchase goods and/or services from the retailer, the system utilizes a retail wallet identity, such as a mobile device 110 running a mobile device application that interfaces with a point-of-sale terminal 116 of a retail point-of-sale system 118 of the retailer and/or a physical instrument (e.g., a smart card or a user issued magnetic striped card which the user utilizes in association with the point-of-sale terminal), and one or more components of the gaming establishment fund management system to enable a user access to this gaming establishment retail account. In other embodiments, the gaming establishment fund management system does not maintain a separate gaming establishment retail account, but rather utilizes the gaming establishment retail wallet system as a transaction coordinator to account for any transactions to purchase goods and/or services from a retailer.

In certain embodiments, a gaming establishment retail account is a retail account associated with a user having a balance or a pre-paid access account which, per current regulations from the U.S. Treasury Department Financial Crimes Enforcement Network ("FinCEN"), cannot be convertible to cash and can only be used for the purchase of goods and/or services. In these embodiments, such a gaming establishment retail account integrates with various retail point-of-sale systems of various retail establishments throughout or otherwise associated with a gaming establishment to enable users to purchase goods and/or services via the user's gaming establishment retail account. Accordingly, in certain embodiments, based on one or more jurisdictional regulations, an amount of funds deposited in a gaming establishment retail account may be used with various retail point-of-sale systems throughout the gaming establishment (or remote from, but otherwise associated with the gaming establishment) to enable users to purchase goods and/or services, but such funds deposited in the gaming establishment retail account cannot be converted to cash or check. In certain other embodiments, based on one or more different jurisdictional regulations, an amount of funds deposited in a gaming establishment retail account, such as an account associated with an identified user, may be used with various retail point-of-sale systems throughout the gaming establishment (or remote from, but otherwise associated with the gaming establishment) to enable users to purchase goods and/or services wherein such funds deposited in the gaming establishment retail account may be converted to or otherwise redeemable for cash or check.

In certain embodiments, the gaming establishment fund management system is in communication with one or more external funding sources which maintain one or more external accounts for the user. For example, as seen in FIG. 1, the gaming establishment fund management system that maintains the enterprise wallet 104 is in communication with an external funding system 120 which is in communication with a network of one or more banks or other financial institutions (i.e., the banking networks 122) which operate to electronically transfer funds between the user's accounts maintained at such banks or financial institutions and one or more of the accounts maintained by the gaming establishment fund management system. In certain embodiments, such external accounts include, but are not limited to, one or more checking accounts maintained by one or more financial institutions (e.g., one or more banks and/or credit unions), one or more savings accounts maintained by one or more financial institutions, one or more financial institution accounts, such as a brokerage account, maintained by one or more financial institutions, one or more credit card accounts maintained by one or more financial institutions, one or more debit card accounts maintained by one or more financial institutions, and/or one or more third-party maintained accounts (e.g., one or more PayPal® accounts or Venmo® accounts). It should be appreciated that while illustrated as the gaming establishment fund management system being in communication with one or more external funding sources, in different embodiments, any system or sub-system of the present disclosure can be in communication with one or more external funding sources. In different embodiments, the system utilizes a mobile device running a mobile device application, a kiosk, a gaming device (e.g., an interface of an EGM or gaming table component), a service window displayed by a gaming device (e.g., a remote host controlled service window displayed by an EGM), a component of a gaming establishment patron management system, such as a player tracking unit, and/or a gaming establishment interface to facilitate the transfer of funds to/from an external account.

In certain embodiments, the gaming establishment fund management system is in communication with one or more front money handling systems which each maintain an amount of front money provided by a user in a front money account. For example, as seen in FIG. 1, the gaming establishment fund management system that maintains the enterprise wallet 104 is in communication with a gaming establishment front money handling system (i.e., the front money handling system 124) to facilitate the access of an amount of funds via front money provided by the user. Such front money is provided by the user, such as via the user depositing cash, gaming table chips, a personal check, a bank draft, a money order or a wire transfer into a front money account associated with the user. The balance of the front money is drawn down from the front money account (in certain instances via the issuance of markers) and accessible by the front money handling system to (either directly or indirectly through a cashless wagering account) a credit balance of a gaming device, such as an EGM 106 and/or a gaming table 108a and/or to (either directly or indirectly through a gaming establishment retail account) a point-of-sale terminal 116 (or an account associated with the point-of-sale terminal). In certain embodiments and as described below, one or more front money balances are associated with certain of the gaming establishment accounts in accordance with the overdraft protection feature of the present disclosure. In other embodiments, one or more front money balances are not associated with the gaming establishment accounts in accordance with the overdraft protection feature of the present disclosure. It should be appreciated that while illustrated as the gaming establishment fund management system being in communication with one or more front money handling systems, in different embodiments, any system or sub-system of the present disclosure can be in communication with one or more front money handling systems. It should be further appreciated that in different embodiments, the system utilizes a mobile device running a mobile device application, a kiosk, a gaming device (e.g., an interface of an EGM or gaming table component), a service window displayed by a gaming device (e.g., a remote host controlled service window displayed by an EGM), a component of a gaming establishment patron management system, such as a player tracking unit, and/or a gaming establishment interface to interface with the gaming establishment front money handling system.

In certain embodiments (not shown), the gaming establishment fund management system is in communication with one or more credit systems which each issue the user one or more lines of credit. These lines of credit are accessible to facilitate a transfer of funds from the line of credit issued by the credit system to (either directly or indirectly through a cashless wagering account) a credit balance of a gaming device, such as an EGM and/or a gaming table and/or to (either directly or indirectly through a gaming establishment retail account) a point-of-sale terminal (or an account associated with the point-of-sale terminal). In certain embodiments, one or more lines of credit are associated with certain of the gaming establishment accounts in accordance with the overdraft protection feature of the present disclosure. In other embodiments, one or more lines of credit are not associated with the gaming establishment accounts in accordance with the overdraft protection feature of the present disclosure. It should be appreciated that the gaming establishment fund management system may be in communication with one or more credit systems, and in different embodiments, any system or sub-system of the present disclosure can be in communication with one or more credit systems. It should be further appreciated that in different embodiments, the system utilizes a mobile device running a mobile device application, a kiosk, a gaming device (e.g., an interface of an EGM or gaming table component), a service window displayed by a gaming device (e.g., a remote host controlled service window displayed by an EGM), a component of a gaming establishment patron management system, such as a player tracking unit, and/or a gaming establishment interface to interface with the gaming establishment credit system.

In certain embodiments (not shown), the gaming establishment fund management system is also in communication with one or more credit reporting/credit risk systems which monitor and report on various accounts associated with the user. For example, the gaming establishment fund management system that maintains the enterprise wallet is in communication with one or more credit reporting and risk systems. These credit reporting and risk systems monitor and report on a credit rating and status of one or more accounts maintained for the user at various funding sources, such as various financial institutions. It should be appreciated that while, in certain embodiments, the gaming establishment fund management system being in communication with one or more credit reporting networks and one or more credit reporting/credit risk systems, in different embodiments, any system or sub-system of the present disclosure can be in communication with one or more credit reporting/credit risk systems.

In certain embodiments, the gaming establishment fund management system is in communication with one or more gaming establishment patron management systems (not shown) that monitor activities at various points of contact associated with the gaming establishment and provides rewards, such as redeemable player tracking points, in association with such activities. It should be appreciated that while, in certain embodiments, the gaming establishment fund management system is in communication with one or more gaming establishment patron management systems, in different embodiments, any system or sub-system of the present disclosure can be in communication with one or more gaming establishment patron management systems. In different embodiments, the system utilizes a mobile device running a mobile device application, a kiosk, an interface of a gaming device (e.g., an interface of an EGM or gaming table component), a service window displayed by a gaming device (e.g., a remote host controlled service window displayed by an EGM), a component of a gaming establishment patron management system, such as a player tracking unit, and/or a gaming establishment interface to interface with the gaming establishment patron management system.

In certain embodiments, the system utilizes one mobile device application to interact with the different components of the gaming establishment fund management system to, amongst other actions, access funds maintained in the different gaming establishment accounts associated with the user. For example, utilizing the same mobile application, a mobile device interacts with both the first cashless wagering system of the gaming establishment fund management system and the gaming establishment retail wallet system of the gaming establishment fund management system. In certain embodiments, the system utilizes multiple mobile device applications to interact with the different components of the gaming establishment fund management system to, amongst other actions, access funds maintained in the different gaming establishment accounts associated with the user. In certain of these embodiments, the mobile device applications include a location based digital wallet enabled application, such as a Passbook-enabled or Wallet-enabled application, which is accessible when the user enters a gaming establishment. In certain of such embodiments, the mobile device applications are downloaded to the mobile device from an application store. In certain of such embodiments, the mobile device applications are downloaded to the mobile device from one or more websites affiliated with the gaming establishment (which are accessible directly by the user and/or by a link opened when the user scans a QR code).

It should be appreciated that in different embodiments, in addition to or alternatively from utilizing a mobile device running a mobile device application to, amongst other actions, access funds associated with different gaming establishment accounts, the system utilizes a kiosk, a gaming device (e.g., an interface of an EGM or gaming table component), a service window displayed by a gaming establishment device (e.g., a remote host controlled service window displayed by an EGM), a display device/input device associated with a seat-level gaming table component, a display device/input device associated with a table-level gaming table component, a display device/input device associated with a mobile gaming table component, a component of a gaming establishment patron management system, such as a player tracking unit, a retail point-of-sale terminal, and/or a gaming establishment interface, such as a casino desk, to, amongst other actions, access the funds associated with such gaming establishment accounts. It should be further appreciated that while illustrated in FIG. 1 as using a mobile device running a mobile device application to access funds associated with different gaming establishment accounts (e.g., a cashless wagering account and a gaming establishment retail account) as mentioned above, a physical instrument, such as a smart card or a user issued magnetic striped card may additionally or alternatively be utilized to enable a user access to such gaming establishment account.

It should be appreciated that while generally described below as utilizing an overdraft protection feature in association with a gaming establishment retail transaction, the overdraft protection feature is applicable for gaming establishment non-retail transactions. That is, in addition to or alternative from using front money associated with a user to provide overdraft protection for a gaming establishment retail transaction with funds withdrawn from a gaming establishment retail account, the system of the present disclosure uses front money associated with a user to provide overdraft protection for other gaming establishment transactions with funds withdrawn from other gaming establishment accounts, such as using front money associated with a user to provide overdraft protection for a transfer of funds from a gaming establishment wagering account to a gaming device.

In various embodiments, prior to enabling a user to purchase goods and/or services with funds in a gaming establishment retail account (which are potentially accessed from front money as part of an overdraft protection feature), a user must first open a gaming establishment retail account with a gaming establishment retail wallet system. In these embodiments, utilizing an interface, such as a mobile device application being executed by a mobile device, a website accessed from a browser, an interface of a retail point-of-sale terminal, and/or a service window displayed by an EGM (or other gaming device), the user attempts to open a gaming establishment retail account through one or more interactive forms. For example, as part of opening a gaming establishment retail account, a user (whom has already logged into one or more gaming establishment fund management system accounts via a mobile device application) makes one or more inputs via an interface to provide certain user identifying information, such as, but not limited to, additional address details, a social security number and/or a mother's maiden name, and/or certain anticipated spending information, such as how the user intends to spend the funds withdrawn from such an account if opened.

In one such embodiment, in association with the opening of the account, the user is provided a physical instrument associated with the gaming establishment patron management system account and/or the gaming establishment account. In another such embodiment, the user is provided a code to activate their account and/or download a mobile identification (e.g., a mobile pass representing a player tracking card) via logging into a mobile device application associated with the gaming establishment or logging into a website associated with the gaming establishment. In another such embodiment, the user is sent a short message service ("SMS") text and/or e-mail informing the user how to activate their account and/or download a mobile identification via logging into a mobile device application associated with the gaming establishment or logging into a website associated with the gaming establishment. In certain embodiments, the system enables a user, such as a retail patron, to enroll or otherwise sign up for such accounts via other avenues, such as via picking up a retail account card at various locations, such as shops, throughout the gaming establishment, via a mobile application running on a mobile device, via a point-of-sale terminal, via an EGM, via a kiosk and/or via adding a retail account to an existing patron account, such as a player tracking account. In another embodiment, the system automatically creates a gaming establishment retail account for a user who is otherwise associated with another gaming establishment account, such as a cashless wagering account.

In certain embodiments, as part of an opening of a gaming establishment retail account or in association with a previously opened gaming establishment retail account, the system enables the user to enroll in an overdraft protection feature associated with the gaming establishment retail account. In these embodiments, the user has the option to opt into linking front money to a gaming establishment retail account to make purchases using funds from the gaming establishment retail account. In certain embodiments, as part of an opening of a gaming establishment retail account or in association with a previously opened gaming establishment retail account, the system enables the user to opt out from an overdraft protection feature associated with the gaming establishment retail account. In these embodiments, the user has the option to unlink front money from a gaming establishment retail account or otherwise not make use of this feature.

In certain embodiments, in association with opting in or opting out of the overdraft protection feature, the system determines zero, one or more overdraft protection controls or restrictions. In certain such embodiments, the overdraft protection control or restriction pertains to the level of user (and/or gaming establishment personnel) involvement in employing the overdraft protection feature. In these embodiments, the system enables the user (and/or gaming establishment personnel) to set the level of involvement to any of: (i) receiving authorization for each transaction that would utilize the overdraft protection feature, (ii) receiving authorization for certain transactions that would utilize the overdraft protection feature (and automatically employing the overdraft protection feature for certain transactions if applicable), or (iii) not receiving any authorization for any transaction that would utilize the overdraft protection feature (and automatically employing the overdraft protection feature if applicable). In different embodiments, the determination of whether or not to obtain authorization from the user (and/or gaming establishment personnel) to invoke the overdraft protection feature is based on one or more factors such as, but not limited to: a status of the user (e.g., a player tracking status of the user as determined via a patron management system), an amount of front money deposited and currently held in a front money account associated with the user, the amount that would be withdrawn from the front money to provide the overdraft protection, the amount that would be withdrawn from the front money to provide the overdraft protection relative to a threshold amount, the amount that would be withdrawn from the front money to provide the overdraft protection relative to a total amount over a period of time, any fees assessed for the amount that would be withdrawn from the front money to provide the overdraft protection, and/or any fees assessed for the amount that would be withdrawn from the front money to provide the overdraft protection relative to a threshold amount.

In certain embodiments, the overdraft protection control or restriction additionally or alternatively pertains to employed limitations in employing the overdraft protection feature. In these embodiments, such use limitations pertain to the frequency of access to the overdraft protection feature and/or the amounts accessed from the overdraft protection feature. In one such embodiment, the system invokes a limit on the number of times the overdraft protection feature may be employed per period of time. For example, the system limits the user to only two instances of using the overdraft protection feature per period of time, such as per week, per month, or per day. In another such embodiment, the system invokes a limit to the amount of the front money that may be utilized for the overdraft protection feature. In another such embodiment, the system invokes a limit to the amount of the front money that may be utilized for the overdraft protection feature per a period of time, wherein this limit is different from an overdraft protection front money limit. In different embodiments, the determination of whether or not to employ such limits on invoking the overdraft protection feature is based on one or more factors such as, but not limited to: a status of the user (e.g., a player tracking status of the user as determined via a patron management system), a discretion of gaming establishment personnel, an amount of front money deposited and currently held in a front money account associated with the user, a historical spend of the user, and/or historical front money activity of the user.

In certain embodiments, the overdraft protection controls are additionally or alternatively associated with the amount of the transaction attempted to be made, such as the amount of the retail purchase attempted. In these embodiments, certain retail purchases having a value above a threshold value that trigger the use of one or more overdraft protection controls while other retail purchases that have a value below the threshold value do not trigger such overdraft protection controls. In certain embodiments, the overdraft protection controls are additionally or alternatively associated with the type of good and/or service of the retail purchase attempted to be made. In these embodiments, certain types of retail purchases trigger the use of one or more overdraft protection controls while other types of retail purchases do not trigger such overdraft protection controls. For example, a first category of purchases, such as food and beverage purchases, can be made without triggering any overdraft protection controls while a second category of purchases, such as clothing retail outlets and entertainment related charges, trigger one or more overdraft protection controls that must be satisfied before the completion of such purchases.

In certain embodiments, the overdraft protection controls are additionally or alternatively associated with a location of the transaction attempted to be made, such as a location of the retail purchase attempted to be made. In these embodiments, different locations where the funds may be used are associated with different overdraft protection controls required to use such funds. For example, the employment of an overdraft protection feature in association with a transaction attempted in association with a first location, such as a gaming establishment gift shop, do not trigger the use of one or more overdraft protection controls while the employment of an overdraft protection feature in association with a transaction attempted in association with a second location, such as a gaming establishment night club, trigger one or more overdraft protection controls.

In certain embodiments, the overdraft protection controls are additionally or alternatively associated with a channel of commerce in which the transaction is attempted to be made. In these embodiments, different channels of commerce where the funds may be used are associated with different overdraft protection controls required to use such funds. In certain embodiments, the overdraft protection controls are additionally or alternatively associated with a time of when the attempted transaction is attempted to be made. In certain embodiments, the overdraft protection controls are additionally or alternatively associated with an amount of funds currently maintained in a gaming establishment account associated with a user. In certain embodiments, the overdraft protection controls are additionally or alternatively associated with a current rate of consumption of the funds in one or more gaming establishment accounts maintained for the user. In one such embodiment, the rate of consumption is based on an amount of transactions made using funds from a gaming establishment account over a set period of time, such as the current day. In another such embodiment, the rate of consumption is based on an amount of transactions made using funds from a gaming establishment account over a rolling period of time, such as the past 24 hours. It should be appreciated that in different embodiments, the system employs a combination of these overdraft protection controls to determine whether or not the overdraft protection feature is permitted.

In certain embodiments, the system employs the same overdraft protection controls for each user whom attempts to complete a transaction with funds at least partially obtained from front money. In certain embodiments, the system employs different overdraft protection controls for different users whom attempt to complete a transaction with funds at least partially obtained from front money. In certain of these embodiments, the system utilizes historical data regarding the user and past gaming establishment transactions in determining one or more aspects of one or more overdraft protection controls to associate with that user. In certain of these embodiments, the system utilizes one or more attributes of the user, such as a player tracking account status of the user, in determining one or more aspects of one or more overdraft protection controls to associate with that user.

In certain embodiments, in association with a linking of front money to a gaming establishment account, the user needs to establish the front money with a gaming establishment front money handling system. In certain such embodiments, this includes a user depositing an amount of front money with a gaming establishment interface, such as presenting a check to gaming establishment personnel, presenting a money order to gaming establishment personnel and/or presenting bank account information to gaming establishment personnel in the event the front money accessed exceeds the front money deposited. Following the establishment of the front money, the system enables the user to utilize any suitable interface to view information about the established front money (e.g., an available amount of funds associated with the front money and/or an amount of funds associated with the front money previously accessed) as well as the balance of zero, one or more gaming establishment accounts.

In certain embodiments, the system employs front money that may be accessed to withdraw funds directly from and may also be accessed to withdraw funds from to protect a gaming establishment account from being overdrawn. Such front money has universal applicability for different types of transactions requested by a user. In certain embodiments, the system employs different types of front monies for different types of transactions requested by a user. In these embodiments, certain front money is available in association with an overdraft protection feature and certain front money is not available in association with an overdraft protection feature. In other words, the gaming establishment front money handling system maintains multiple distinct and separate front money balances such as a front money balance that may be accessed to withdraw funds directly from and a front money balance that may be accessed to withdraw funds from to protect a gaming establishment account from being overdrawn.

In certain embodiments, the system employs the same limits to different front money balances associated with the same user. In certain embodiments, the system employs different limits to different front money balances associated with the same user. In certain embodiments wherein the system imposes one or more fees for accessing the front money, the system employs the same fees to different front monies associated with the same user. In certain embodiments, the system employs different fees to different front monies associated with the same user.

It should be appreciated that certain jurisdictional regulations and/or gaming establishment policies require the user to approve a transaction to access front money funds. In one such embodiment, the user acknowledges the approval of accessing front money funds, when needed, such as to employ an overdraft protection feature, by entering a personal identification number ("PIN") via the mobile device application, providing a signature and/or presenting a biometric identifier to the mobile device. In another embodiment, the user acknowledges the approval of accessing front money funds, when needed, such as to employ an overdraft protection feature, by entering a PIN, providing a signature and/or presenting a biometric identifier to a retail point-of-sale terminal or a peripheral device associated with the retail point-of-sale terminal.

Figure 2A:
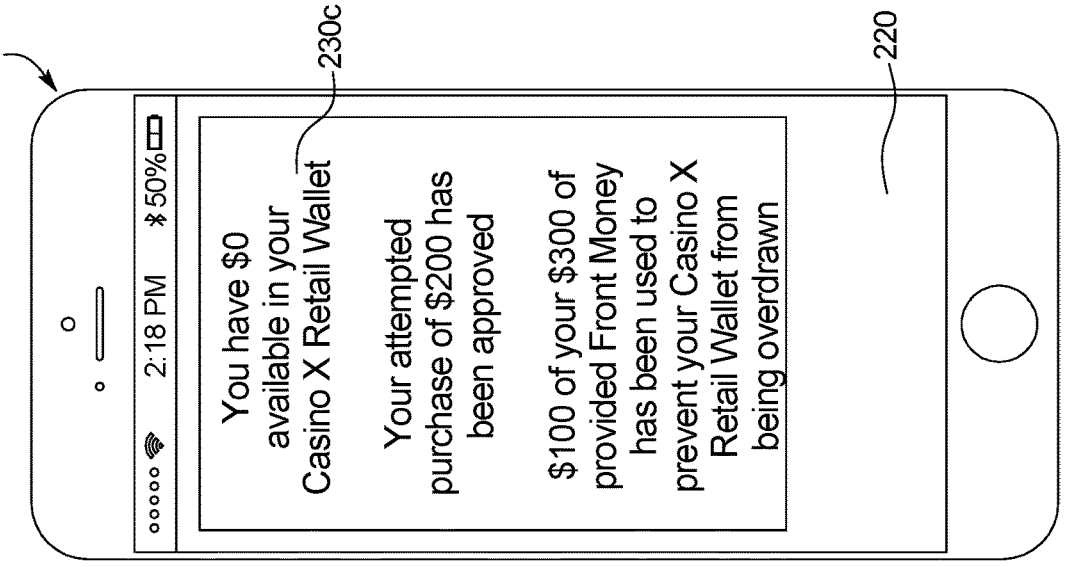
FIGS. 2A, 2B, and 2C are example graphical user interfaces displayed in connection with accessing an amount of front money provided by the user for overdraft protection purposes to facilitate a purchase using a gaming establishment retail wallet.

Following the gaming establishment fund management system and/or the gaming establishment retail system determining to authorize the user to make retail purchases subject to zero, one or more overdraft protection measures, then following any required acknowledgement by the user of any required terms and conditions associated with using a gaming establishment retail account to purchase goods and/or services associated with the gaming establishment, the gaming establishment fund management system and/or the gaming establishment retail system notifies the user, if applicable, regarding the different ways the user may pay for retail purchases utilizing funding options provided by the gaming establishment fund management system. For example, the gaming establishment fund management system and/or the gaming establishment retail system notifies the user, via one or more of a message displayed on a displayed message at a gaming establishment device (e.g., an EGM or a retail point-of-sale terminal), an email, a SMS or text message, and/or a notification displayed by a mobile device application. For example, as seen in FIG. 2A, the system employs a mobile device 210 executing a mobile device application 220 to display to a user a message 230a regarding the current balance of a gaming establishment retail account and the availability of overdraft protection for this gaming establishment retail account.

In certain embodiments, to facilitate the transfer of funds from a gaming establishment retail account to an account associated with a retailer to purchase goods and/or services from the retailer, the user presents a retail wallet identity (e.g., a physical card associated with the gaming establishment retail account, a mobile device running a mobile device application associated with the gaming establishment retail account, or a mobile device that presents an identity associated with the user or the user's gaming establishment retail account) to potentially access the funds in the gaming establishment retail account for the purchase transaction. In these embodiments, upon the presentation of the retail wallet identity at an applicable point-of-sale terminal of a retail point-of-sale system within or otherwise associated with the gaming establishment for the purchase of goods and/or services, the system determines whether or not to complete the attempted retail purchase. For example, when a purchase of goods and/or services is attempted to be made with funds from a gaming establishment retail account using a mobile device application at a point-of-sale terminal, the mobile device application prompts the user to cause the mobile device to engage the point-of-sale terminal, such as prompting the user to tap the mobile device to a designated portion of the point-of-sale terminal (or otherwise moving the mobile device to within a designated distance of a designated location of the point-of-sale terminal). Such engagement initiates a pairing or linkage between the mobile device and the point-of-sale terminal (or a component of a gaming establishment fund management system located inside the point-of-sale terminal (i.e., a component of the point-of-sale terminal)), wherein the pairing or linkage between the mobile device and the point-of-sale terminal occurs via one or more applications being run or executed on the mobile device. In this example, after such engagement, the mobile device application communicates, via a wireless communication protocol (including, but not limited to: Bluetooth™, Bluetooth™ Low Energy ("BLE"), one or more cellular communication standards (e.g., 3G, 4G, 5G, 6G, LTE), one or more Wi-Fi compatible standards, and one or more short range communication protocols (e.g., a near field communication ("NFC") protocol), data associated with the retail wallet identity to the point-of-sale terminal to facilitate the potential purchase of goods and/or services. In various embodiments, in addition to or alternative from attempting to make purchases of goods and/or services with funds in a gaming establishment retail account at a point-of-sale terminal, the system of the present disclosure enables a user to attempt to make purchases of goods and/or services with funds in a gaming establishment retail account via any suitable interface, such as a user interface of an EGM, a user interface of a gaming table component associated with a gaming table, a kiosk, a mobile device application being executed by a mobile device, a service window displayed by a gaming device (e.g., a remote host controlled service window displayed by an EGM), and/or a gaming establishment interface (e.g., a casino desk).

In various embodiments, upon receiving data or information regarding the retail wallet identity, the retail point-of-sale system interfaces with, such as via one or more application programming interfaces, the gaming establishment fund management system to determine if the gaming establishment retail account has adequate funds for the intended purchase. Upon receiving the request of the determined amount of funds and logging the user into a gaming establishment account associated with the user (if necessary), a component of the gaming establishment retail wallet system (and/or another component of the gaming establishment fund management system) determines whether to authorize the transfer of the determined amount of funds. In these embodiments, the component of the gaming establishment retail wallet system (e.g., one or more servers of the retail wallet system) and/or the component of the gaming establishment fund management system (e.g., one or more servers of the gaming establishment fund management system) determines whether the gaming establishment retail account includes an amount of funds at least equal to the requested amount of funds to complete the transaction.

If the gaming establishment retail wallet system (and/or another component of the gaming establishment fund management system) confirms the presence of adequate funds in the gaming establishment retail account, the retail point-of-sale system (and/or another component of the gaming establishment fund management system) authorizes the sale of the goods and/or services. The gaming establishment retail wallet system (and/or another component of the gaming establishment fund management system) then proceeds to transfer an amount of funds to cover the purchased goods and/or services from the gaming establishment retail account to an account associated with the retail point-of-sale system (and/or the retail establishment) to complete the purchase of the goods and/or services. In these embodiments, if the component of the gaming establishment retail wallet system (and/or another component of the gaming establishment fund management system) determines to authorize the determined amount of funds because the amount of funds in the gaming establishment retail account at least equals the requested amount of funds to complete the purchase transaction, the component of the gaming establishment retail wallet system (and/or another component of the gaming establishment fund management system) updates the gaming establishment retail account associated with the user (to reflect the transfer out of the requested amount of funds) and communicates an authorization to the point-of-sale terminal. Such a transfer of funds to complete the purchase of the goods and/or services is associated with a transaction identification which one or more components of the system store for reporting purposes.

It should be appreciated that in certain embodiments, upon the gaming establishment fund management system determining that the entire amount of the requested amount of funds to complete the purchase transaction are available from the gaming establishment retail account maintained by the gaming establishment fund management system, the requested transaction is completed without accessing any front money as any overdraft protection. As such, certain embodiments of transferring funds from a gaming establishment account to complete a retail purchase involve the user requesting, via an interface, an amount of funds to be transferred to complete the purchase, and if the requested amount of funds can be covered by the funds currently associated with a gaming establishment retail account, facilitate the transfer of funds from the gaming establishment retail account without accessing any funds from any front money employed to provide overdraft protection.

On the other hand, if the gaming establishment retail wallet system (and/or another component of the gaming establishment fund management system) indicates that the gaming establishment retail account lacks adequate funds for the attempted purchase, the gaming establishment retail wallet system (and/or another component of the gaming establishment fund management system) determines whether to employ any overdraft protection features to potentially facilitate the completion of the purchase transaction. In these embodiments, the determination of whether to complete the attempted purchase transaction when the gaming establishment retail account lacks the funds to otherwise complete the purchase transaction is based on whether the gaming establishment retail account is associated with any overdraft protection features, whether any overdraft protection features comply with any overdraft protection controls in place and whether an amount of front money associated with the overdraft protection feature is available to facilitate the transaction.

In these embodiments, if a determination occurs that the gaming establishment retail account is not associated with any overdraft protection features backed by any front money, the gaming establishment retail wallet system (and/or another component of the gaming establishment fund management system) denies the purchase transaction because the gaming establishment retail account lacks adequate funds. In other words, if a gaming establishment retail account is not associated with enough of a balance to fund an attempted sale transaction and no overdraft protection features are available for the gaming establishment retail account, the retail point-of-sale system (and/or the gaming establishment fund management system) denies the sale transaction of the goods and/or services using the gaming establishment retail account. In certain embodiments, the system utilizes the denial of the attempted purchase to offer the user the opportunity to sign up for overdraft protection backed by front money provided by the user.

In certain embodiments, even if the gaming establishment retail account is associated with overdraft protection backed by front money provided by the user, if a determination occurs that the employment of the overdraft protection violates any applicable overdraft protection controls, the gaming establishment retail wallet system (and/or another component of the gaming establishment fund management system) denies the purchase transaction. For example, if an overdraft protection control requires that a user authorize each transaction in which front money is accessed to provide overdraft protection and the user has denied the accessing of the front money (or not affirmatively provided authorization) following a determination that the gaming establishment account lacks adequate funds to complete the purchase, the overdraft protection control prevents the access to the front money to provide the overdraft protection and prevents the purchase transaction from being completed.

On the other hand, if a determination occurs that the requested transaction complies with any applicable overdraft protection controls, the gaming establishment retail wallet system (and/or another component of the gaming establishment fund management system) interfaces with, such as via one or more application programming interfaces, a component of a gaming establishment front money handling system (e.g., one or more servers of a gaming establishment front money handling system) to determine if the difference between the amount of funds to complete the transaction and any funds in the gaming establishment retail account can be withdrawn from front money associated with the user. That is, following a determination that a shortfall exists between the amount of funds needed to complete the purchase and the amount of funds available to be transferred from the gaming establishment retail account, a component of the gaming establishment front money handling system determines whether or not to authorize that the shortfall be covered by an amount of funds accessed from the front money provided by the user employed to offer overdraft protection. In other words, if the system determines that the balance of the gaming establishment retail account associated with the user lacks sufficient funds to cover the attempted purchase, the system queries the gaming establishment front money handling system to determine if the user has a sufficient front money balance to, when combined with funds available from the gaming establishment retail account, at least equal the amount of funds associated with the attempted purchase.

In certain such embodiments, following receipt, from the component of the gaming establishment fund management system, of data associated with an amount of funds to be accessed from the front money balance (that, when combined with any contribution of any funds from any gaming establishment retail account, form the amount of funds to be transferred as part of the purchase transaction), the gaming establishment front money handling system logs the user into the gaming establishment front money handling system (if necessary) and requests access to the amount of funds from the front money of the user. The gaming establishment front money handling system then proceeds with determining whether to complete the transfer of the amount of funds to be accessed from the front money of the user.

Figure 2B:
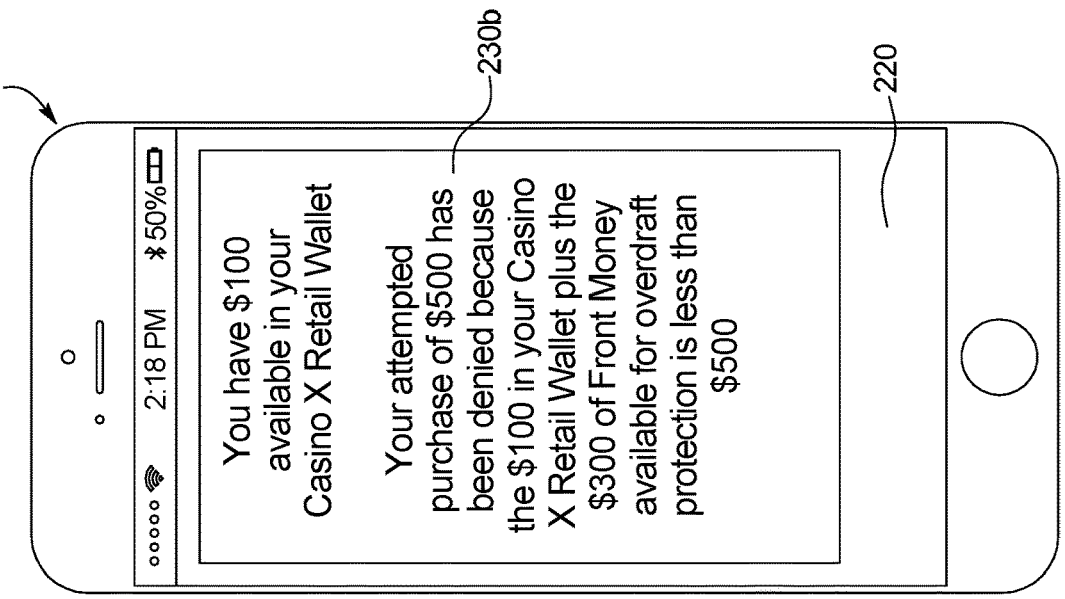

In certain embodiments, to complete a transfer of the amount of funds associated with the front money of the user to account for any shortfall in the funds otherwise in the gaming establishment retail account, the gaming establishment front money handling system determines whether to authorize the access of the amount of funds from the front money associated with the user. If the component of the front money handling system determines not to authorize the transfer of the amount of funds to be accessed from the front money of the user, the system communicates data to the component of the gaming establishment fund management system denying the request of funds accessed from the front money of the user. For example, if the gaming establishment front money handling system determines that an amount of funds available from the front money of the user is less than the requested amount of funds needed to complete the purchase, the gaming establishment front money handling system denies the access of funds from the front money of the user and does not otherwise invoke usage of the overdraft protection feature associated with the gaming establishment retail account. Without access to the funds from the front money of the user and aware that the amount of funds in the gaming establishment retail account are insufficient to cover the attempted purchase, the gaming establishment fund management system communicates a denial of the attempted purchase to the retail point-of-sale terminal. In these embodiments, even if the gaming establishment retail account is associated with overdraft protection backed by front money provided by the user, if the component of the front money handling system determines that the amount of funds available from the front money are inadequate (or otherwise in violation of one or more overdraft protection controls), when combined with any funds from the gaming establishment retail account, to cover the amount of the purchase, the system does not proceed with the purchase. In certain embodiments, the system utilizes the denial of the purchase to offer the user the opportunity to apply to increase the balance of front money employed for overdraft protection. In certain other embodiments, the gaming establishment fund management system and/or the gaming establishment retail system notifies the user, via one or more of a message displayed on a displayed message at a gaming establishment device, an email, a SMS or text message, and/or a notification displayed by a mobile device application of the reasons for denying the transaction. For example, as seen in FIG. 2B, the system employs a mobile device 210 executing a mobile device application 220 to display to a user a message 230*b* regarding the current balance of a gaming establishment retail account and the amount of front money available for overdraft protection not collectively being enough to complete the purchase.

On the other hand, if the component of the gaming establishment front money handling system determines to authorize the transfer the amount of funds from the front money account of the user, the component of the gaming establishment front money handling system operates with the component of the gaming establishment fund management system to access an amount of funds from the front money account (and, in certain instances, issue a marker associated with the funds accessed from the front money provided by the user) and then transfer the accessed amount of funds to facilitate the completion of the transaction. In these embodiments, if the gaming establishment front money handling system determines to authorize the access to an amount of funds from the front money provided by the user, the gaming establishment front money handling system updates the amount available in the front money account to reflect the amount withdrawn from the front money account, issues, in certain embodiments, a marker for the amount withdrawn from the front money account, and communicates an authorization of the amount of funds to the gaming establishment fund management system. Upon receiving the authorization, the gaming establishment fund management system updates a balance of a gaming establishment retail account by the amount of funds accessed from the front money provided by the user.

Figure 2C:
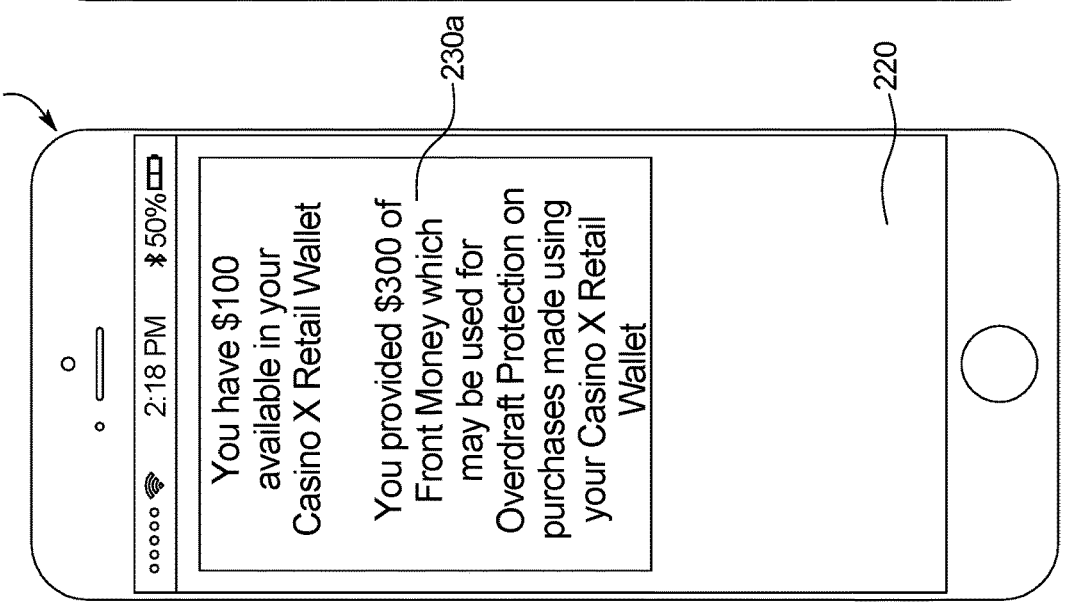

Following the transfer of funds accessed from the front money provided by the user to the gaming establishment retail account and aware that the amount of funds now in the gaming establishment retail account at least equals the requested amount of funds to complete the purchase transaction, the component of the gaming establishment fund management system operates with the component of the gaming establishment retail system to complete the transaction. That is, upon the gaming establishment retail wallet system (and/or another component of the gaming establishment fund management system) confirming the presence of adequate funds in the gaming establishment retail account, the gaming establishment retail wallet system (and/or the gaming establishment fund management system) authorizes the sale of the goods and/or services. The gaming establishment retail wallet system (and/or another component of the gaming establishment fund management system) then proceeds to transfer an amount of funds to cover the purchased goods and/or services from the gaming establishment retail account to an account associated with the retail point-of-sale system (and/or the retail establishment) to complete the purchase of the goods and/or services. In these embodiments, if the component of the gaming establishment retail wallet system (and/or another component of the gaming establishment fund management system) determines to authorize the determined amount of funds because the amount of funds currently in the gaming establishment retail account (which has been supplemented with user provided front money to prevent being overdrawn) at least equals the requested amount of funds to complete the purchase transaction, the component of the gaming establishment retail wallet system (and/or another component of the gaming establishment fund management system) updates the gaming establishment retail account associated with the user (to reflect the transfer out of the requested amount of funds) and communicates an authorization to the point-of-sale terminal. Such a transfer of funds to complete the purchase of the goods and/or services is associated with a transaction identification which one or more components of the system store for reporting purposes. In certain embodiments, the gaming establishment fund management system and/or the gaming establishment retail system notifies the user, via one or more of a message displayed on a displayed message at a gaming establishment device, an email, a SMS or text message, and/or a notification displayed by a mobile device application of the completion of the transaction, the current balances of one or more accounts (including one or more front money accounts). For example, as seen in FIG. 2C, the system employs a mobile device 210 executing a mobile device application 220 to display to a user a message 230c regarding the current balance of a gaming establishment retail account and the current balance of the front money account used for overdraft protection.

Accordingly, a plurality of different components of the system of the present disclosure (i.e., a retail point-of-sale terminal, a retail point-of-sale system, a gaming establishment retail system, a gaming establishment fund management system and a gaming establishment front money handling system) interact with each other to potentially enable a user to purchase goods and/or services using an amount of funds accessed from the front money provided by the user in association with an overdraft protection feature of a gaming establishment retail account. It should be appreciated that to account for the access of funds from different accounts (e.g., a gaming establishment retail account and a front money account) to complete the purchase transaction, these different components of the system interact with each other to provide that the various transactions involved are linked together (via a transaction identifier) such that the user is presented these separate transactions as a single transaction.

It should be appreciated that, as mentioned above, while generally described as utilizing an overdraft protection feature in association with a gaming establishment retail transaction, the overdraft protection feature is applicable for gaming establishment non-retail transactions. That is, in addition to or alternative from using front money associated with a user to provide overdraft protection for a gaming establishment retail transaction with funds withdrawn from a gaming establishment retail account, the system of the present disclosure uses the front money associated with a user to provide overdraft protection for other gaming establishment transactions with funds withdrawn from other gaming establishment accounts, such as using front money associated with a user to provide overdraft protection for a transfer of funds from a gaming establishment wagering account to a gaming device. In certain embodiments wherein the gaming establishment device is an EGM, following the transfer of the requested amount of funds to a gaming establishment account (sourced, at least in part, by accessing front money associated with the gaming establishment account via an overdraft protection feature), the transferred amounts of funds are available for wagering by the user at the EGM. In certain other embodiments, wherein the gaming establishment device is a gaming table component, following the transfer of the requested amount of funds (sourced, at least in part, by accessing front money associated with the gaming establishment account via an overdraft protection feature), gaming establishment personnel issue the user at the gaming table an amount of gaming chips (corresponding to the amount of transferred funds) for wagering on one or more plays of one or more games at the gaming table. In certain such embodiments, the gaming table component causes a display device to display instructions to gaming establishment personnel to issue the user an amount of gaming chips corresponding to the amount of transferred funds and/or causes a printer to generate a receipt with instructions to gaming establishment personnel to issue the user an amount of gaming chips corresponding to the amount of transferred funds. It should be appreciated that in these embodiments, since the user has identified themselves to the gaming table component (e.g., via the gaming device interface and/or the mobile device application which the user has logged into) and since the fund transfer requests also includes data identifying the user, the information displayed to the gaming establishment personnel includes identifying information regarding the user to issue the gaming chips to. In one such embodiment, the identifying information includes the user's name. In another such embodiment, the identifying information additionally or alternatively includes the seat at the gaming table where the user is located. In another such embodiment, the identifying information additionally or alternatively includes a picture of the user.

In these embodiments, following providing instructions to gaming establishment personnel to issue the identified user an amount of gaming chips corresponding to the amount of transferred funds and following the gaming establishment personnel making one or more inputs indicating a completion of the issuance of the amount of gaming chips corresponding to the amount of transferred funds, the gaming table component causes a receipt to be generated associated with the issuance of the amount of gaming chips. In one such embodiment, the receipt is a physical receipt which the gaming establishment personnel deposited in a drop box or otherwise retains until submitted to the gaming establishment. In another such embodiment, the receipt is a virtual receipt which is communicated to one or more gaming establishment accounting servers. It should be appreciated that in these embodiments, since the issuance of chips from an electronic transfer of funds to the gaming table must be accounted for when reconciling the transactions associated with the gaming table, the gaming table component causes the generation of a receipt to memorialize the electronic transaction. For example, if a dealer at a gaming table provides the user a quantity of gaming chips corresponding to the amount of funds electronically transferred to the gaming table component, the dealer deposits the printed receipt into a dropbox at the gaming table such that at the end of the dealer's shift, the gaming chip tray is balanced when accounting for the cash which the dealer exchanged for gaming chips and the electronic fund transfers which the dealer exchanged for gaming chips. In another example, if a gaming establishment mobile staff member servicing an area with multiple gaming tables provides a user a quantity of gaming chips corresponding to the amount of funds electronically transferred to the mobile gaming table component carried by the mobile staff member, the mobile staff member deposits the printed receipt into a pouch or folder they carry with them such that at the end of the mobile staff member's shift, the gaming chips initially provided to the mobile staff member is balanced when accounting for the cash which the mobile staff member exchanged for gaming chips and the electronic fund transfers which the mobile staff member exchanged for gaming chips.

In certain embodiments wherein the gaming establishment device is a gaming table component, the gaming table is an intelligent gaming table which enables one or more users to play one or more suitable games by placing one or more wagers utilizing gaming chips. In this embodiment, the gaming table component is part of (or otherwise associated with) the intelligent gaming table and includes zero, one or more input devices (to receive inputs to facilitate the electronic transfer of funds to and from the gaming table component), and zero, one or more display devices (to display information to the user and/or gaming establishment personnel regarding the electronic transfer of funds to and from the gaming table component). In certain embodiments, the gaming table component additionally includes a communication interface (such as a wireless communication interface to communicate with a mobile device regarding the electronic transfer of funds to and from the gaming table component) and/or a printer (to generate a receipt regarding the electronic transfer of funds to and from the gaming table component).

In certain embodiments wherein the gaming establishment device is a gaming table component, the gaming table is a non-intelligent gaming table including a suitable support structure, such as one or more legs, a playing surface and a dealer position. In this embodiment, the gaming table component is separate from but associated with the gaming table and includes zero, one or more input devices (to receive inputs to facilitate the electronic transfer of funds to and from the gaming table component), and zero, one or more display devices (to display information to the user and/or gaming establishment personnel regarding the electronic transfer of funds to and from the gaming table component). In certain embodiments, the gaming table component additionally includes or is otherwise associated with a communication interface (such as a wireless communication interface to communicate with a mobile device regarding the electronic transfer of funds to and from the gaming table component), a player identification device associated with the gaming table (such as a card reader to enable the player to log into the gaming table) and/or a printer (to generate a receipt regarding the electronic transfer of funds to and from the gaming table component).

In certain embodiments wherein the gaming establishment device is a gaming table component, regardless of if an intelligent gaming table or a non-intelligent gaming table are utilized, the gaming table component is a mobile gaming table component associated with one or more of such gaming tables. In this embodiment, the mobile gaming table component is associated with gaming establishment personnel. For example, a tablet or mobile device associated with a gaming establishment mobile staff member qualifies as a mobile gaming table component. In these embodiments, the mobile gaming table component includes zero, one or more input devices (to receive inputs to facilitate the electronic transfer of funds to and from the gaming table component), and zero, one or more display devices (to display information to the user and/or gaming establishment personnel regarding the electronic transfer of funds to and from the gaming table component). The mobile gaming table component additionally includes or is otherwise associated with a communication interface (such as a wireless communication interface to communicate with a mobile device regarding the electronic transfer of funds to and from the gaming table component), a player identification device associated with the gaming table (such as a card reader to enable the player to log into the gaming table) and/or a printer (to generate a receipt regarding the electronic transfer of funds to and from the gaming table component).

In certain embodiments, the coordination of transferring funds to a gaming establishment device from one or more gaming establishment accounts (including, in certain instances, a front money account) is executed by a component of the gaming establishment fund management system, such as a component of the gaming establishment front money handling system. In certain other embodiments, the coordination of transferring funds to a gaming establishment device from one or more gaming establishment accounts (including, in certain instances, a front money account) is executed by the gaming establishment device. In certain such embodiments, the gaming establishment device queries the component of the gaming establishment fund management system, such as the component of the gaming establishment front money handling system if a shortfall exists between the amount of funds requested and the amount of funds available from the gaming establishment account maintained by the gaming establishment fund management system and/or the amount of funds available from the front money associated with the user.

In certain embodiments, the system employs multiple different funding sources to provide overdraft protection. In certain such embodiments, in addition to utilizing an amount of front money provided by a user to fund such an overdraft protection feature, the system employs one or more overdraft protection lines of credit which are activated to fund such an overdraft protection feature. In certain embodiments, the system additionally or alternatively employs an amount of funds transferred from one or more external accounts to fund such an overdraft protection feature. For example, the system utilizes an amount of funds transferred, within minutes, from a credit card account to fund the overdraft protection feature. In another example, since different external funding sources are associated with different periods of time until the funds become available to use in association with an overdraft protection feature, the system makes use of different funding sources during such different periods of time. That is, to account for certain funding sources taking a designated period of time, such as transfers made using the automated clearing house network taking up to five days, to complete a transfer of funds from that funding source, the system provides the access to funds attempted to be transferred from that funding source (to be used for overdraft protection purposes) prior to the funding source actually authorizing and completing the transfer of such funds. In these instances, upon a user's attempted transfer of an amount of funds from such an external funding source, a component of a gaming establishment credit system issues the user an overdraft protection line of credit associated with the attempted transferred amount of funds. Following the issuing of the overdraft protection line of credit, the system enables funds associated with the overdraft protection line of credit to be available to provide the overdraft protection feature of the present disclosure. In these embodiments, upon the funding source authorizing and completing the transfer of the requested amount of funds, the system automatically closes (i.e., marks as paid) the overdraft protection line of credit with the gaming establishment credit system and converts any balance remaining from the overdraft protection line of credit to an amount of funds which are usable to fund the overdraft protection. On the other hand, upon the funding source rejecting the attempted transfer of an amount of funds (or not authorizing the attempted transfer of an amount of funds after a designated period of time), the system causes the gaming establishment credit system to mark the overdraft protection line of credit as in default, freeze any remaining funds associated with the overdraft protection line of credit, disable the overdraft protection feature and attempt to recover any debt the user may have incurred using the previously issued overdraft protection line of credit.

In certain embodiments wherein the system employs multiple different funding sources to provide overdraft protection, the system prioritizes which funding source to use to fund the overdraft protection feature at any particular time. In certain such embodiments, the system prioritizes which funding source to use based on one or more features of the funding source such as, but not limited to, an amount of funds available from that funding source, when an amount of funds will be available from that funding source, any fees associated with that funding source, any controls or restrictions associated with that funding source, and/or any repayment terms associated with that funding source. In certain embodiments wherein the system employs multiple different funding sources to provide overdraft protection, the system enables the user to select which funding source to use to fund the overdraft protection feature at any particular time.

It should be appreciated that while the requested amount of funds transferred to the gaming establishment device are sourced as multiple transactions from one or more funding systems (e.g., a gaming establishment fund management system and a gaming establishment front money handling system), and while each transaction is associated with a unique transaction identifier, these multiple transactions are grouped together using a master transaction identifier. That is, while data associated with each of these multiple transactions are individually stored in a database in association with each transaction's unique transaction identifier, to facilitate tracking and coordination of these multiple transactions derived from a single fund transfer request, these unique transaction identifiers are further stored in association with the master transaction identifier. It should be appreciated that while each individual transfer of funds of the system of the present disclosure may be associated with an individual unique transaction identifier, in certain embodiments, each individual modification of one or more accounts are also associated with individual unique transaction identifiers that are linked to one or more most transaction identifiers.

In certain embodiments, the employment of a master transaction identifier linked to individual unique transaction identifiers enables the efficient voiding of one or more transactions. In these embodiments, when voiding a transaction, since the system must void multiple separately occurring transactions that each individually contributed to completing the requested transaction, the master transaction identifier is used to identify the various individual transactions that occurred that need to be individually voided. In certain embodiments, the employment of a master transaction identifier linked to individual unique transaction identifiers enables any receipt, whether printed or virtual, to include details about the master transaction as well as the associated individual transactions. That is, while the multiple completed individual transactions associated with transferring funds from multiple funding sources are conveyed to the user as a single transaction and do not require the user to initiate multiple transactions, any record of the funding transaction made available to the user includes the details of each individual transaction for the user's reference.

In various embodiments, prior to using funds in a gaming establishment retail account to purchase goods and/or services with or without the aid of overdraft protection backed by front money provided by the user, the system enables the gaming establishment retail account to be funded from one or more sources. In certain embodiments, the system enables the gaming establishment retail account to be directly funded from one or more of such sources. In certain embodiments, the system enables the gaming establishment retail account to be indirectly funded from one or more of such sources, such as by an amount of funds from such sources first being transferred to another gaming establishment account and then such an amount of funds being transferred from the other gaming establishment account to the gaming establishment retail account.

In certain embodiments, the gaming establishment fund management account is associated with one or more external accounts, such as one or more credit card accounts, one or more debit card accounts and/or one or more third-party maintained accounts (e.g., one or more PayPal® accounts or Venmo® accounts). In certain embodiments, the gaming establishment fund management account is associated with a gaming establishment or a group of gaming establishments, wherein the user establishes a gaming establishment fund management account, such as a gaming establishment retail account, by a deposit of funds (such as at a kiosk) to be subsequently utilized in association with the mobile device application. In other embodiments, the gaming establishment fund management account, such as a gaming establishment retail account, is funded via a mobile device electronic fund transfer, such using Apple Pay™ or Android Pay™. It should be appreciated that in different embodiments, the system utilizes a mobile device running a mobile device application, a kiosk, an EGM, a gaming table component, a service window displayed by a gaming device (e.g., a remote host controlled service window displayed by an EGM) and/or a gaming establishment interface to facilitate the transfer of funds from a third-party account. In certain embodiments, the system enables funds to be deposited in a gaming establishment fund management account, such as a gaming establishment retail account, via activating a line of credit associated with the user.

In certain embodiments, the system enables funds to be deposited in a gaming establishment fund management account, such as a gaming establishment retail account, via a gaming device, such as an EGM. In certain embodiments, the system enables a user that has an amount of cash to utilize a gaming device to convert the cash to an amount deposited into a gaming establishment fund management account (which may be subsequently transferred utilizing a mobile device application). In other embodiments, the system enables funds to be deposited in a gaming establishment fund management account via a gaming device that accepts printed ticket vouchers. In these embodiments, the system enables a user that has one or more printed ticket vouchers to utilize a gaming device to convert the printed ticket voucher to an amount deposited into a gaming establishment fund management account (which may be subsequently transferred utilizing a mobile device application).

In certain embodiments, the system enables funds to be deposited in a gaming establishment fund management account, such as a gaming establishment retail account, via a gaming establishment interface, such as a gaming establishment cage or desk. In certain embodiments, the system enables a user that has an amount of cash to utilize a gaming establishment interface, such as a gaming establishment cage or desk to convert the cash to an amount deposited into a gaming establishment fund management account (which may be subsequently transferred utilizing a mobile device application). In other embodiments, the system enables funds to be deposited in a gaming establishment fund management account via a gaming establishment interface that accepts printed ticket vouchers. In these embodiments, the system enables a user that has one or more printed ticket vouchers to utilize a gaming establishment interface to convert the printed ticket voucher to an amount deposited into a gaming establishment fund management account (which may be subsequently transferred utilizing a mobile device application).

In certain embodiments, the system enables funds to be deposited in a gaming establishment fund management account, such as a gaming establishment retail account, via a kiosk that accepts money. In certain embodiments, the system enables a user that has an amount of cash to utilize a kiosk to convert the cash to an amount deposited into a gaming establishment fund management account (which may be subsequently transferred to a gaming device utilizing a mobile device application). In other embodiments, the system enables funds to be deposited in a gaming establishment fund management account via a kiosk that accepts printed ticket vouchers. In certain embodiments, the system enables a user that has one or more printed ticket vouchers to utilize a kiosk to convert the printed ticket voucher to an amount deposited into a gaming establishment fund management account (which may be subsequently transferred to a gaming device utilizing a mobile device application).

In certain embodiments, the gaming establishment fund management account, such as a gaming establishment retail account, is associated with funds associated with one or more virtual ticket vouchers. In certain embodiments, the system enables a user associated with an amount of virtual ticket vouchers to utilize a gaming device (e.g., an EGM, a component of an EGM) a mobile device running a mobile device application, a kiosk and/or a gaming establishment interface to convert the virtual ticket vouchers to an amount deposited into a gaming establishment fund management account.

In certain embodiments, the system enables a user to fund the gaming establishment fund management account, such as a gaming establishment retail account, independent of the mobile device and independent of the mobile device application. In certain other embodiments, the system enables a user to utilize a mobile device running a mobile device application to fund the gaming establishment fund management account. More specifically and utilizing the example of a kiosk, in one embodiment, to utilize a mobile device and a kiosk to facilitate the funding of a gaming establishment fund management account, the user wirelessly pairs or otherwise connects a mobile device with a kiosk. In one example embodiment, the user moves the mobile device into the range of a wireless receiver of the kiosk. The kiosk and the launched or activated mobile device application of the mobile device negotiate a secure, authenticated connection with the proper functionality, versions and security settings. It should be appreciated that the kiosk wirelessly connects with the mobile device running the mobile device application in the same or similar fashion to how a mobile device is paired or connected with a gaming device of the present disclosure. After connecting the mobile device to the kiosk, the kiosk prompts the user to deposit an amount of funds into the kiosk. In one such embodiment, the kiosk prompts the user to insert one or more bills into a bill acceptor of the kiosk. In another such embodiment, the kiosk additionally or alternatively prompts the user to deposit a physical ticket voucher (associated with an amount of funds) into the kiosk. In another such embodiment, the kiosk additionally or alternatively prompts the user to deposit a card associated with an external account, such as a credit card or debit card into the kiosk. In another such embodiment, the kiosk additionally or alternatively prompts the user to enter information associated with an external account, such as a credit card account, a PayPal® account, a Venmo® account, or a debit card account into the kiosk. In another such embodiment, the kiosk additionally or alternatively prompts the user to deposit an amount of funds into the kiosk using a mobile device electronic fund transfer, such using Apple Pay™ or Android Pay™.

In certain embodiments, upon receiving an amount of funds from the user and the user indicating to transfer the deposited amount of funds in association with the mobile device application, the kiosk communicates with one or more servers to transfer an amount of money to a gaming establishment fund management account. In another such embodiment, upon receiving an amount of funds from the user and the user indicating to transfer the deposited amount of funds in association with an account or balance associated with the mobile device application, the kiosk communicates with one or more servers, such as a virtual ticket voucher server, to create a virtual ticket voucher associated with the amount of received currency. The system of the present disclosure transfers the created virtual ticket voucher to the gaming establishment fund management account.

It should be appreciated that the electronic fund data transfers of the present disclosure may occur in addition to or as an alternative from cash-based fund transfers and/or ticket voucher-based fund transfers. In one such embodiment, an amount of funds transferred to a gaming establishment device (e.g., an EGM or a retail point-of-sale terminal) is funded via any of an electronic fund transfer, a cash-based fund transfer or a ticket voucher-based fund transfer. In another embodiment, an amount of funds transferred from a gaming establishment device (e.g., an EGM or a gaming table component) is cashed out via any of an electronic fund transfer, a cash-based fund transfer or a ticket voucher-based fund transfer. In another embodiment, an amount of funds transferred to a gaming establishment device (e.g., an EGM or a retail point-of-sale terminal) is funded via an electronic fund transfer or a cash-based fund transfer (but is not funded via any ticket voucher-based fund transfer). In another embodiment, an amount of funds transferred from a gaming establishment device (e.g., an EGM or a gaming table component) is cashed out via an electronic fund transfer or a cash-based fund transfer (but is not cashed out via any ticket voucher-based fund transfer). In another embodiment, an amount of funds transferred to a gaming establishment device (e.g., an EGM or a retail point-of-sale terminal) is funded via an electronic fund transfer or a ticket voucher-based fund transfer (but is not funded via any cash-based fund transfer). In another embodiment, an amount of funds transferred from a gaming establishment device (e.g., an EGM or a gaming table component) is cashed out via an electronic fund transfer or a ticket voucher-based fund transfer (but is not cashed out via any cash-based fund transfer). In another embodiment, an amount of funds transferred to a gaming establishment device (e.g., an EGM or a retail point-of-sale terminal) is funded via an electronic fund transfer (but is not funded via a cash-based fund transfer nor a ticket voucher-based fund transfer). In another embodiment, an amount of funds transferred from a gaming establishment device (e.g., an EGM or a gaming table component) is cashed out via an electronic fund transfer (but is not cashed out via a cash-based fund transfer nor a ticket voucher-based fund transfer).

It should be appreciated that any functionality or process of the present disclosure may be implemented via one or more servers (associated with or independent of any component of any system disclosed herein), one or more gaming establishment devices (e.g., a gaming device such as an EGM or a non-gaming device such as a point-of-sale terminal), one or more components of a gaming establishment device (such as a component of a gaming establishment management system supported by or otherwise located inside the gaming establishment device), or a mobile device application. For example, while certain data or information of the present disclosure is explained as being communicated from a gaming establishment device, or a component associated with a gaming establishment device to a mobile device via one or more wireless communication protocols, such data or information may additionally or alternatively be communicated from one or more servers to a mobile device via one or more wireless communication protocols. Accordingly: (i) while certain functions, features or processes are described herein as being performed by a gaming establishment device or a component associated with a gaming establishment device, such functions, features or processes may alternatively be performed by one or more servers, or one or more mobile device applications, or one or more gaming establishment components, (ii) while certain functions, features or processes are described herein as being performed by one or more mobile device applications, such functions, features or processes may alternatively be performed by one or more servers, one or more gaming establishment devices, one or more components of a gaming establishment device, or one or more gaming establishment components, (iii) while certain functions, features or processes are described herein as being performed by one or more servers, such functions, features or processes may alternatively be performed by one or more gaming establishment devices, one or more components of a gaming establishment device, one or more mobile device applications, or one or more gaming establishment components, and (iv) while certain functions, features or processes are described herein as being performed by one or more gaming establishment components, such functions, features or processes may alternatively be performed by one or more gaming establishment devices, one or more components of a gaming establishment device, or one or more servers.

In certain embodiments, the above-described embodiments of the present disclosure may be implemented in accordance with or in conjunction with zero, one or more components of a gaming establishment fund management system (e.g., a cashless wagering system or a gaming establishment retail system); zero, one or more components of a gaming establishment front money handling system; zero, one or more components of a gaming establishment patron management system; zero, one or more components of a retail point-of-sale system; and/or zero, one or more gaming establishment devices. In these embodiments, such components of the gaming establishment fund management system, the gaming establishment front money handling system, the gaming establishment patron management system, the retail point-of-sale system and/or the gaming establishment device each include a controller including at least one processor.

The at least one processor is any suitable processing device or set of processing devices, such as a microprocessor, a microcontroller-based platform, a suitable integrated circuit, or one or more application-specific integrated circuits (ASICs), configured to execute software enabling various configuration and reconfiguration tasks, such as: (1) communicating with a remote source (such as a server that stores authentication information or fund information) via a communication interface of the controller; (2) converting signals read by an interface to a format corresponding to that used by software or memory of the component of the gaming establishment fund management system, the component of the gaming establishment front money handling system, the component of the retail point-of-sale system and/or the gaming establishment device; (3) accessing memory to configure or reconfigure parameters in the memory according to indicia read from the component of the gaming establishment fund management system, the component of the gaming establishment front money handling system, the component of the retail point-of-sale system and/or the gaming establishment device; (4) communicating with interfaces and the peripheral devices (such as input/output devices); and/or (5) controlling the peripheral devices. In certain embodiments, one or more components of the controller (such as the at least one processor) reside within a housing of the component of the gaming establishment fund management system, the component of the gaming establishment front money handling system, the component of the retail point-of-sale system and/or the gaming establishment device, while in other embodiments, at least one component of the controller resides outside of the housing of the component of the gaming establishment fund management system, the component of the gaming establishment front money handling system, the component of the retail point-of-sale system and/or the gaming establishment device.

The controller also includes at least one memory device, which includes: (1) volatile memory (e.g., RAM which can include non-volatile RAM, magnetic RAM, ferroelectric RAM, and any other suitable forms); (2) non-volatile memory (e.g., disk memory, FLASH memory, EPROMs, EEPROMs, memristor-based non-volatile solid-state memory, etc.); (3) unalterable memory (e.g., EPROMs); (4) read-only memory; and/or (5) a secondary memory storage device, such as a non-volatile memory device, configured to store software related information (the software related information and the memory may be used to store various files not currently being used and invoked in a configuration or reconfiguration). Any other suitable magnetic, optical, and/or semiconductor memory may operate in conjunction with the component of the gaming establishment fund management system, the component of the gaming establishment front money handling system, the component of the retail point-of-sale system and/or the gaming establishment device disclosed herein. In certain embodiments, the at least one memory device resides within the housing of the component of the gaming establishment fund management system, the component of the gaming establishment front money handling system, the component of the retail point-of-sale system and/or the gaming establishment device, while in other embodiments at least one component of the at least one memory device resides outside of the housing of the component of the gaming establishment fund management system, the component of the gaming establishment front money handling system, the component of the retail point-of-sale system and/or the gaming establishment device. In these embodiments, any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

The at least one memory device is configured to store, for example: (1) configuration software, such as all the parameters and settings on the component of the gaming establishment fund management system, the component of the gaming establishment front money handling system, the component of the retail point-of-sale system and/or the gaming establishment device; (2) associations between configuration indicia read from the component of the gaming establishment fund management system, the component of the gaming establishment front money handling system, the component of the retail point-of-sale system and/or the gaming establishment device with one or more parameters and settings; (3) communication protocols configured to enable the at least one processor to communicate with the peripheral devices; and/or (4) communication transport protocols (such as TCP/IP, USB, Firewire, IEEE1394, Bluetooth, IEEE 802.11x (IEEE 802.11 standards), hiperlan/2, HomeRF, etc.) configured to enable the component of the gaming establishment fund management system, the component of the gaming establishment front money handling system, the component of the retail point-of-sale system and/or the gaming establishment device to communicate with local and non-local devices using such protocols. In one implementation, the controller communicates with other devices using a serial communication protocol. A few non-limiting examples of serial communication protocols that other devices, such as peripherals (e.g., a bill validator or a ticket printer), may use to communicate with the controller include USB, RS-232, and Netplex (a proprietary protocol developed by IGT).

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Computer program code for carrying out operations for aspects of the present disclosure may be written in any combination of one or more programming languages, including an object oriented programming language such as Java, Scala, Smalltalk, Eiffel, JADE, Emerald, C++, C #, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

In certain embodiments, the at least one memory device is configured to store program code and instructions executable by the at least one processor of the component of the gaming establishment fund management system, the component of the gaming establishment front money handling system, the component of the retail point-of-sale system and/or the gaming establishment device to control the component of the gaming establishment fund management system, the component of the gaming establishment front money handling system, the component of the retail point-of-sale system and/or the gaming establishment device. In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a retail patron uses such a removable memory device in a component of the gaming establishment fund management system to implement at least part of the present disclosure. In other embodiments, part or all of the program code and/or the operating data is downloaded to the at least one memory device of the component of the gaming establishment fund management system, the component of the gaming establishment front money handling system, the component of the retail point-of-sale system and/or the gaming establishment device through any suitable data network described above (such as an Internet or intranet).

The at least one memory device also stores a plurality of device drivers. Examples of different types of device drivers include device drivers for the component of the gaming establishment fund management system, the component of the gaming establishment front money handling system, the component of the retail point-of-sale system and/or the gaming establishment device and device drivers for the peripheral components. Typically, the device drivers utilize various communication protocols that enable communication with a particular physical device. The device driver abstracts the hardware implementation of that device. For example, a device driver may be written for each type of card reader that could potentially be connected to the component of the gaming establishment fund management system, the component of the gaming establishment front money handling system, the component of the retail point-of-sale system and/or the gaming establishment device. Non-limiting examples of communication protocols used to implement the device drivers include Netplex, USB, Serial, Ethernet, Firewire, I/O debouncer, direct memory map, serial, PCI, parallel, RF, Bluetooth™, near-field communications (e.g., using near-field magnetics), 802.11 (WiFi), etc. In one embodiment, when one type of a particular device is exchanged for another type of the particular device, the at least one processor of the component of the gaming establishment fund management system, the component of the gaming establishment front money handling system, the component of the retail point-of-sale system and/or the gaming establishment device loads the new device driver from the at least one memory device to enable communication with the new device. For instance, one type of card reader in the component of the gaming establishment fund management system, the component of the gaming establishment front money handling system, the component of the retail point-of-sale system and/or the gaming establishment device can be replaced with a second different type of card reader when device drivers for both card readers are stored in the at least one memory device.

In certain embodiments, the software units stored in the at least one memory device can be upgraded as needed. For instance, when the at least one memory device is a hard drive, new parameters, new settings for existing parameters, new settings for new parameters, new device drivers, and new communication protocols can be uploaded to the at least one memory device from the controller or from some other external device. As another example, when the at least one memory device includes a CD/DVD drive including a CD/DVD configured to store options, parameters, and settings, the software stored in the at least one memory device can be upgraded by replacing a first CD/DVD with a second CD/DVD. In yet another example, when the at least one memory device uses flash memory or EPROM units configured to store options, parameters, and settings, the software stored in the flash and/or EPROM memory units can be upgraded by replacing one or more memory units with new memory units that include the upgraded software. In another embodiment, one or more of the memory devices, such as the hard drive, may be employed in a software download process from a remote software server.

In some embodiments, the at least one memory device also stores authentication and/or validation components configured to authenticate/validate specified components of the component of the gaming establishment fund management system, the component of the gaming establishment front money handling system, the component of the retail point-of-sale system and/or the gaming establishment device and/or information, such as hardware components, software components, firmware components, peripheral device components, user input device components, information received from one or more user input devices, information stored in the at least one memory device, etc.

In certain embodiments, the peripheral devices include several device interfaces, such as, but not limited to: (1) at least one output device including at least one display device; (2) at least one input device (which may include contact and/or non-contact interfaces); (3) at least one transponder; (4) at least one wireless communication component; (5) at least one wired/wireless power distribution component; (6) at least one sensor; (7) at least one data preservation component; (8) at least one motion/gesture analysis and interpretation component; (9) at least one motion detection component; (10) at least one portable power source; (11) at least one geolocation module; (12) at least one user identification module; (13) at least one user/device tracking module; and (14) at least one information filtering module.

The at least one output device includes at least one display device configured to display any suitable information. In certain embodiments, the display devices are connected to or mounted on a housing of the component of the gaming establishment fund management system, the component of the gaming establishment front money handling system, the component of the retail point-of-sale system and/or the gaming establishment device. In various embodiments, the display devices serve as digital glass configured to aspects of the gaming establishment in which the component of the gaming establishment fund management system, the component of the gaming establishment front money handling system, the component of the retail point-of-sale system and/or the gaming establishment device is located. In various embodiments, the component of the gaming establishment fund management system, the component of the gaming establishment front money handling system, the component of the retail point-of-sale system and/or the gaming establishment device includes zero, one or more of the following display devices: (a) a central display device; (b) a player tracking display configured to display various information regarding a user's player tracking status; (c) a secondary or upper display device in addition to the central display device and the player tracking display; (d) a credit display configured to display a current quantity of credits, amount of cash, account balance, or the equivalent; and (e) a bet display. In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. The display devices may be of any suitable sizes, shapes, and configurations.

In various embodiments, the at least one output device includes a payout device. In these embodiments, after the component of the gaming establishment fund management system, the component of the gaming establishment front money handling system, the component of the retail point-of-sale system and/or the gaming establishment device receives an actuation, the component of the gaming establishment fund management system, the component of the gaming establishment front money handling system, the component of the retail point-of-sale system and/or the gaming establishment device causes the payout device to provide a payment to the user. In one embodiment, the payout device is one or more of: (a) a ticket printer and dispenser configured to print and dispense a ticket or credit slip associated with a monetary value, wherein the ticket or credit slip may be redeemed for its monetary value via a cashier, a kiosk, or other suitable redemption system; (b) a bill dispenser configured to dispense paper currency; (c) a coin dispenser configured to dispense coins or tokens (such as into a coin payout tray); and (d) any suitable combination thereof. In certain embodiments, rather than dispensing bills, coins, or a physical ticket having a monetary value to the user following receipt of an actuation of the cashout device, the payout device is configured to cause a payment to be provided to the user in the form of an electronic funds transfer, such as via a direct deposit into a bank account, a casino account, or a prepaid account of the user; via a transfer of funds onto an electronically recordable identification card or smart card of the user; or via sending a virtual ticket having a monetary value to an electronic device of the user.

In certain embodiments, the at least one output device is a sound generating device controlled by one or more sound cards. In one such embodiment, the sound generating device includes one or more speakers or other sound generating hardware and/or software configured to generate sounds, such as by playing music. In another such embodiment, the component of the gaming establishment fund management system, the component of the gaming establishment front money handling system, the component of the retail point-of-sale system and/or the gaming establishment device provides dynamic sounds coupled with attractive multimedia images displayed on one or more of the display devices to provide an audio-visual representation or to otherwise display full-motion video with sound to attract users to the component of the gaming establishment fund management system, the component of the gaming establishment front money handling system, the component of the retail point-of-sale system and/or the gaming establishment device. In certain embodiments, the component of the gaming establishment fund management system, the component of the gaming establishment front money handling system, the component of the retail point-of-sale system and/or the gaming establishment device displays a sequence of audio and/or visual attraction messages during idle periods to attract potential users to the component of the gaming establishment fund management system, the component of the gaming establishment front money handling system, the component of the retail point-of-sale system and/or the gaming establishment device. The videos may be customized to provide any appropriate information.

The at least one input device may include any suitable device that enables an input signal to be produced and received by the at least one processor of the component of the gaming establishment fund management system, the component of the gaming establishment front money handling system, the component of the retail point-of-sale system and/or the gaming establishment device. In one embodiment, the at least one input device includes a payment device configured to communicate with the at least one processor of the component of the gaming establishment fund management system, the component of the gaming establishment front money handling system, the component of the retail point-of-sale system and/or the gaming establishment device to fund the component of the gaming establishment fund management system, the component of the gaming establishment front money handling system, the component of the retail point-of-sale system and/or the gaming establishment device. In certain embodiments, the payment device includes zero, one or more of: (a) a bill acceptor into which paper money is inserted; (b) a ticket acceptor into which a ticket or a voucher is inserted; (c) a reader or a validator for credit cards, debit cards, or credit slips into which a credit card, debit card, or credit slip is inserted; (d) a player identification card reader into which a player identification card is inserted; or (e) any suitable combination thereof. In one embodiment, the at least one input device includes a payment device configured to enable the component of the gaming establishment fund management system, the component of the gaming establishment front money handling system, the component of the retail point-of-sale system and/or the gaming establishment device to be funded via an electronic funds transfer, such as a transfer of funds from a bank account. In another embodiment, the component of the gaming establishment fund management system, the component of the gaming establishment front money handling system, the component of the retail point-of-sale system and/or the gaming establishment device includes a payment device configured to communicate with a mobile device of a user, such as a mobile phone, a radio frequency identification tag, or any other suitable wired or wireless device, to retrieve relevant information associated with that user to fund the component of the gaming establishment fund management system, the component of the gaming establishment front money handling system, the component of the retail point-of-sale system and/or the gaming establishment device. When the component of the gaming establishment fund management system, the component of the gaming establishment front money handling system, the component of the retail point-of-sale system and/or the gaming establishment device is funded, the at least one processor determines the amount of funds entered and displays the corresponding amount.

In various embodiments, the at least one input device includes a plurality of buttons that are programmable by the component of the gaming establishment fund management system, the component of the gaming establishment front money handling system, the component of the retail point-of-sale system and/or the gaming establishment device operator to, when actuated, cause the component of the gaming establishment fund management system, the component of the gaming establishment front money handling system, the component of the retail point-of-sale system and/or the gaming establishment device to perform particular functions. For instance, such buttons may be hard keys, programmable soft keys, or icons icon displayed on a display device of the component of the gaming establishment fund management system, the component of the gaming establishment front money handling system, the component of the retail point-of-sale system and/or the gaming establishment device that are actuatable via a touch screen of the component of the gaming establishment fund management system, the component of the gaming establishment front money handling system, the component of the retail point-of-sale system and/or the gaming establishment device or via use of a suitable input device of the component of the gaming establishment fund management system, the component of the gaming establishment front money handling system, the component of the retail point-of-sale system and/or the gaming establishment device. In certain embodiments, the at least one input device includes a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the component of the gaming establishment fund management system, the component of the gaming establishment front money handling system, the component of the retail point-of-sale system and/or the gaming establishment device by touching the touch screen at the appropriate locations.

The at least one wireless communication component includes one or more communication interfaces having different architectures and utilizing a variety of protocols, such as (but not limited to) 802.11 (WiFi); 802.15 (including Bluetooth™); 802.16 (WiMax); 802.22; cellular standards such as CDMA, CDMA2000, and WCDMA; Radio Frequency (e.g., RFID); infrared; and Near Field Magnetic communication protocols. The at least one wireless communication component transmits electrical, electromagnetic, or optical signals that carry digital data streams or analog signals representing various types of information.

The at least one wired/wireless power distribution component includes components or devices that are configured to provide power to other devices. For example, in one embodiment, the at least one power distribution component includes a magnetic induction system that is configured to provide wireless power to one or more user input devices near the component of the gaming establishment fund management system, the component of the gaming establishment front money handling system, the component of the retail point-of-sale system and/or the gaming establishment device. In one embodiment, a user input device docking region is provided, and includes a power distribution component that is configured to recharge a user input device without requiring metal-to-metal contact. In one embodiment, the at least one power distribution component is configured to distribute power to one or more internal components of the component of the gaming establishment fund management system, the component of the gaming establishment front money handling system, the component of the retail point-of-sale system and/or the gaming establishment device, such as one or more rechargeable power sources (e.g., rechargeable batteries) located at the component of the gaming establishment fund management system, the component of the gaming establishment front money handling system, the component of the retail point-of-sale system and/or the gaming establishment device.

In certain embodiments, the at least one sensor includes at least one of: optical sensors, pressure sensors, RF sensors, infrared sensors, image sensors, thermal sensors, and biometric sensors. The at least one sensor may be used for a variety of functions, such as: detecting movements and/or gestures of various objects within a predetermined proximity to the component of the gaming establishment fund management system, the component of the gaming establishment front money handling system, the component of the retail point-of-sale system and/or the gaming establishment device; detecting the presence and/or identity of various persons (e.g., users, casino employees, etc.), devices (e.g., user input devices), and/or systems within a predetermined proximity to the component of the gaming establishment fund management system, the component of the gaming establishment front money handling system, the component of the retail point-of-sale system and/or the gaming establishment device.

The at least one data preservation component is configured to detect or sense one or more events and/or conditions that, for example, may result in damage to the component of the gaming establishment fund management system, the component of the gaming establishment front money handling system, the component of the retail point-of-sale system and/or the gaming establishment device and/or that may result in loss of information associated with the component of the gaming establishment fund management system, the component of the gaming establishment front money handling system, the component of the retail point-of-sale system and/or the gaming establishment device. Additionally, the data preservation system may be operable to initiate one or more appropriate action(s) in response to the detection of such events/conditions.

The at least one motion/gesture analysis and interpretation component is configured to analyze and/or interpret information relating to detected user movements and/or gestures to determine appropriate user input information relating to the detected user movements and/or gestures. For example, in one embodiment, the at least one motion/gesture analysis and interpretation component is configured to perform one or more of the following functions: analyze the detected gross motion or gestures of a user; interpret the user's motion or gestures (e.g., in the context of a casino game being played) to identify instructions or input from the user; utilize the interpreted instructions/input to advance the game state; etc. In other embodiments, at least a portion of these additional functions may be implemented at a remote system or device.

The at least one portable power source enables the component of the gaming establishment fund management system, the component of the gaming establishment front money handling system, the component of the retail point-of-sale system and/or the gaming establishment device to operate in a mobile environment.

The at least one geolocation module is configured to acquire geolocation information from one or more remote sources and use the acquired geolocation information to determine information relating to a relative and/or absolute position of the component of the gaming establishment fund management system, the component of the gaming establishment front money handling system, the component of the retail point-of-sale system and/or the gaming establishment device. For example, in one implementation, the at least one geolocation module is configured to receive GPS signal information for use in determining the position or location of the component of the gaming establishment fund management system, the component of the gaming establishment front money handling system, the component of the retail point-of-sale system and/or the gaming establishment device. In another implementation, the at least one geolocation module is configured to receive multiple wireless signals from multiple remote devices (e.g., component of the gaming establishment fund management system, the gaming establishment patron management system, the retail point-of-sale system and/or the gaming establishment devices, servers, wireless access points, etc.) and use the signal information to compute position/location information relating to the position or location of the component of the gaming establishment fund management system, the component of the gaming establishment front money handling system, the component of the retail point-of-sale system and/or the gaming establishment device.

The at least one user identification module is configured to determine the identity of the current user or current owner of the component of the gaming establishment fund management system, the component of the gaming establishment front money handling system, the component of the retail point-of-sale system and/or the gaming establishment device. For example, in one embodiment, the current user is required to perform a login process at the component of the gaming establishment fund management system, the component of the gaming establishment front money handling system, the component of the retail point-of-sale system and/or the gaming establishment device in order to access one or more features. Alternatively, the component of the gaming establishment fund management system, the component of the gaming establishment front money handling system, the component of the retail point-of-sale system and/or the gaming establishment device is configured to automatically determine the identity of the current user based on one or more external signals, such as an RFID tag or badge worn by the current user and that provides a wireless signal to the component of the gaming establishment fund management system, the component of the gaming establishment front money handling system, the component of the retail point-of-sale system and/or the gaming establishment device that is used to determine the identity of the current user. In at least one embodiment, various security features are incorporated into the component of the gaming establishment fund management system, the component of the gaming establishment front money handling system, the component of the retail point-of-sale system and/or the gaming establishment device to prevent unauthorized users from accessing confidential or sensitive information.

The at least one information filtering module is configured to perform filtering (e.g., based on specified criteria) of selected information to be displayed at one or more displays of the component of the gaming establishment fund management system, the component of the gaming establishment front money handling system, the component of the retail point-of-sale system and/or the gaming establishment device.

In various embodiments, the component of the gaming establishment fund management system, the component of the gaming establishment front money handling system, the component of the retail point-of-sale system and/or the gaming establishment device includes a plurality of communication ports configured to enable the at least one processor of the component of the gaming establishment fund management system, the component of the gaming establishment front money handling system, the component of the retail point-of-sale system and/or the gaming establishment device to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices.

As generally described above, in certain embodiments, the component of the gaming establishment fund management system, the component of the gaming establishment front money handling system, the component of the retail point-of-sale system and/or the gaming establishment device has a support structure, housing, or cabinet that provides support for a plurality of the input devices and the output devices of the component of the gaming establishment fund management system, the component of the gaming establishment front money handling system, the component of the retail point-of-sale system and/or the gaming establishment device.

It should be appreciated that the terminology used herein is for the purpose of describing particular aspects only and is not intended to be limiting of the disclosure. For example, the singular forms "a", "an" and "the" are intended to include the plural forms as well, unless the context clearly indicates otherwise. In another example, the terms "including" and "comprising" and variations thereof, when used in this specification, specify the presence of stated features, steps, operations, elements, and/or components, but do not preclude the presence or addition of one or more other features, steps, operations, elements, components, and/or groups thereof. Additionally, a listing of items does not imply that any or all of the items are mutually exclusive nor does a listing of items imply that any or all of the items are collectively exhaustive of anything or in a particular order, unless expressly specified otherwise. Moreover, as used herein, the term "and/or" includes any and all combinations of one or more of the associated listed items. It should be further appreciated that headings of sections provided in this document and the title are for convenience only, and are not to be taken as limiting the disclosure in any way. Furthermore, unless expressly specified otherwise, devices that are in communication with each other need not be in continuous communication with each other and may communicate directly or indirectly through one or more intermediaries.

Various changes and modifications to the present embodiments described herein will be apparent to those skilled in the art. For example, a description of an embodiment with several components in communication with each other does not imply that all such components are required, or that each of the disclosed components must communicate with every other component. On the contrary a variety of optional components are described to illustrate the wide variety of possible embodiments of the present disclosure. As such, these changes and modifications can be made without departing from the spirit and scope of the present subject matter and without diminishing its intended technical scope. It is therefore intended that such changes and modifications be covered by the appended claims.

The invention is claimed as follows:

1. A system comprising:
   a processor; and
   a memory device that stores a plurality of instructions that, when executed by the processor following an occurrence of a request to complete a transaction associated with a first amount of funds from a gaming establishment account, cause the processor to:
   responsive to the gaming establishment account being associated with overdraft protection and the gaming establishment account being associated with a second amount of funds that is less than the first amount of funds, communicate, to a gaming establishment device associated with the request to complete the transaction, data associated with an authorization to complete the transaction, wherein a difference between the first amount of funds and the second amount of funds is accessed from an amount of front money associated with a user and maintained in a gaming establishment front money account independent of the gaming establishment account, and
   responsive to the gaming establishment account not being associated with overdraft protection and the gaming establishment account being associated with the second amount of funds that is less than the first amount of funds, communicate, to the gaming establishment device, data associated with a denial to complete the transaction.

2. The system of claim 1, wherein the gaming establishment device comprises a gaming device, the gaming establishment account comprises a cashless wagering account and the transaction comprises a transfer of the first amount of funds to a balance of the gaming device.

3. The system of claim 2, wherein the gaming device comprises any of an electronic gaming machine and a gaming table component associated with a gaming table.

4. The system of claim 1, wherein the gaming establishment device comprises a point-of-sale retail terminal, and the gaming establishment account comprises a gaming establishment retail account.

5. The system of claim 4, wherein the transaction comprises a transfer of the first amount of funds to an account associated with the point-of-sale retail terminal.

6. The system of claim 1, wherein the communication, to the gaming establishment device, of data associated with the authorization to complete the transaction occurs following an approval of access of the difference between the first amount of funds and the second amount of funds from the amount of front money.

7. The system of claim 6, wherein following the approval of access of the difference between the first amount of funds and the second amount of funds from the amount of fund money, the difference between the first amount of funds and the second amount of funds are transferred to the gaming establishment account.

8. The system of claim 1, wherein responsive to the gaming establishment account being associated with overdraft protection and the gaming establishment account being associated with the second amount of funds that is less than the first amount of funds, the communication, to the gaming establishment device, of data associated with the authorization to complete the transaction occurs independent of any inputs received associated with any access of any of the amount of front money.

9. A system comprising:
   a processor; and
   a memory device that stores a plurality of instructions that, when executed by the processor after an establishment of overdraft protection associated with a gaming establishment account, cause the processor to:
   receive data associated with a request to access a first amount of funds from the gaming establishment account when the gaming establishment account is associated with a second amount of funds that is less than the first amount of funds, and
   responsive to the request complying with an overdraft protection control:
      communicate a request for a third amount of funds to a component of a gaming establishment front money handling system that maintains, independent of the gaming establishment account, an amount of front money in a gaming establishment front money account associated with a user, and
      responsive to the third amount of funds being transferred from the front money associated with the user to the gaming establishment account, approve the request to access the first amount of funds from the gaming establishment account.

10. The system of claim 9, wherein the memory device stores a plurality of further instructions that, when executed by the processor responsive to the request not complying with the overdraft protection control, cause the processor to deny access of the first amount of funds from the gaming establishment account.

11. The system of claim 9, wherein the memory device stores a plurality of further instructions that, when executed by the processor responsive to the third amount of funds not being accessible from the front money associated with the user, cause the processor to deny the access of the first amount of funds from the gaming establishment account.

12. The system of claim 9, wherein the overdraft protection control is associated with at least one of: an authorization from the user associated with the front money to proceed, and an authorization from gaming establishment personnel to proceed.

13. The system of claim 9, wherein the overdraft protection control is associated with at least one of: an identity of the user associated with the amount of front money, and a frequency of accessing the amount of front money.

14. A method of operating a system, the method comprising:
following an occurrence of a request to complete a transaction associated with a first amount of funds from a gaming establishment account:
responsive to the gaming establishment account being associated with overdraft protection and the gaming establishment account being associated with a second amount of funds that is less than the first amount of funds, communicating, by a processor and to a gaming establishment device associated with the request to complete the transaction, data associated with an authorization to complete the transaction, wherein a difference between the first amount of funds and the second amount of funds is accessed from an amount of front money associated with a user and maintained in a gaming establishment front money account independent of the gaming establishment account, and
responsive to the gaming establishment account not being associated with overdraft protection and the gaming establishment account being associated with the second amount of funds that is less than the first amount of funds, communicating, by the processor and to the gaming establishment device, data associated with a denial to complete the transaction.

15. The method of claim 14, wherein the gaming establishment device comprises a gaming device, the gaming establishment account comprises a cashless wagering account and the transaction comprises a transfer of the first amount of funds to a balance of the gaming device.

16. The method of claim 14, wherein the gaming establishment device comprises a point-of-sale retail terminal, and the gaming establishment account comprises a gaming establishment retail account.

17. The method of claim 16, wherein the transaction comprises a transfer of the first amount of funds to an account associated with the point-of-sale retail terminal.

18. The method of claim 14, wherein the communication, to the gaming establishment device, of data associated with the authorization to complete the transaction occurs following an approval of access of the difference between the first amount of funds and the second amount of funds from the amount of front money.

19. The method of claim 18, wherein following the approval of access of the difference between the first amount of funds and the second amount of funds from the amount of front money, the difference between the first amount of funds and the second amount of funds are transferred to the gaming establishment account.

20. The method of claim 14, wherein responsive to the gaming establishment account being associated with overdraft protection and the gaming establishment account being associated with the second amount of funds that is less than the first amount of funds, the communication, to the gaming establishment device, of data associated with the authorization to complete the transaction occurs independent of any inputs received associated with any access of any of the amount of front money.

* * * * *